United States Patent
Han et al.

(10) Patent No.: US 11,526,205 B2
(45) Date of Patent: Dec. 13, 2022

(54) METHODS AND APPARATUS TO IMPLEMENT ALWAYS-ON CONTEXT SENSOR HUBS FOR PROCESSING MULTIPLE DIFFERENT TYPES OF DATA INPUTS

(71) Applicant: Intel Corporation, Santa Clara, CA (US)

(72) Inventors: Ke Han, Shanghai (CN); Mingqiu Sun, Beaverton, OR (US); Dong Wang, Shanghai (CN); Prakash Iyer, Portland, OR (US); Stephan Jourdan, Portland, OR (US); Andrzej Mialkowski, Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/734,820

(22) PCT Filed: Dec. 31, 2018

(86) PCT No.: PCT/CN2018/125996
§ 371 (c)(1),
(2) Date: Dec. 3, 2020

(87) PCT Pub. No.: WO2020/140184
PCT Pub. Date: Jul. 9, 2020

(65) Prior Publication Data
US 2021/0232199 A1 Jul. 29, 2021

(51) Int. Cl.
*G06F 1/32* (2019.01)
*G06F 9/48* (2006.01)
(Continued)

(52) U.S. Cl.
CPC ............ *G06F 1/329* (2013.01); *G06F 1/3296* (2013.01); *G06F 9/4881* (2013.01)

(58) Field of Classification Search
None
See application file for complete search history.

(56) References Cited

U.S. PATENT DOCUMENTS

| 8,635,263 B2 * | 1/2014 | Shikano | H04L 67/12 |
| | | | 709/224 |
| 8,706,172 B2 * | 4/2014 | Priyantha | G06F 1/3293 |
| | | | 455/574 |

(Continued)

OTHER PUBLICATIONS

International Search Authority, "Written Opinion of the International Searching Authority," mailed in connection with international application No. PCT/CN2018/125996, dated Sep. 27, 2019, 3 pages.
(Continued)

*Primary Examiner* — Fahmida Rahman
(74) *Attorney, Agent, or Firm* — Hanley, Flight & Zimmerman, LLC

(57) ABSTRACT

Methods and apparatus to implement always-on context sensor hubs for processing multiple different types of data inputs are disclosed. An examples apparatus includes a first processor core to implement a host controller, and a second processor core to implement an offload engine. The host controller includes first logic to process sensor data associated with an electronic device when the electronic device is in a low power mode. The host controller is to offload a computational task associated with the sensor data to the offload engine. The offload engine includes second logic to execute the computational task.

24 Claims, 13 Drawing Sheets

(51) Int. Cl.
   *G06F 1/329* (2019.01)
   *G06F 1/3296* (2019.01)

(56) References Cited

U.S. PATENT DOCUMENTS

| | | | |
|---|---|---|---|
| 9,323,314 B1* | 4/2016 | Jia | G06F 1/3293 |
| 10,127,051 B2 | 11/2018 | Lee et al. | |
| 2012/0254878 A1 | 10/2012 | Nachman et al. | |
| 2013/0061237 A1 | 3/2013 | Zaarur et al. | |
| 2015/0022368 A1* | 1/2015 | Smith | G08B 21/18 |
| | | | 340/693.3 |
| 2016/0091955 A1* | 3/2016 | Black | G06F 1/3293 |
| | | | 702/189 |
| 2016/0283284 A1* | 9/2016 | Sun | G06F 1/329 |
| 2016/0335534 A1 | 11/2016 | Nere et al. | |
| 2017/0185457 A1 | 6/2017 | Sun et al. | |
| 2017/0323199 A1 | 11/2017 | Wu | |
| 2018/0307624 A1 | 10/2018 | Zmora et al. | |
| 2018/0348763 A1 | 12/2018 | Jiang et al. | |
| 2018/0349205 A1* | 12/2018 | Kolluru | G06F 11/3058 |

OTHER PUBLICATIONS

International Searching Authority, "International Search Report," mailed in connection with international application No. PCT/CN2018/125996, dated Sep. 27, 2019, 3 pages.

Android Open Source Project, "Context Hub Runtime Environment (CHRE)," open source project, available at https://source.android.com/devices/contexthub, accessed Dec. 14, 2020, 9 pages.

Greenwaves Technologies, "The fundamentals of GAP, the IoT application processors," product webpage, available at https://greenwaves-technologies.com/gap8_gap9/, accessed Dec. 14, 2020, 3 pages.

Ouicklogic, "Ultra-low power, multi-core Arm Cortex M4 MCU family," product webpage, available at https://www.quicklogic.com/products/soc/, accessed Dec. 14, 2020, 2 pages.

European Patent Office, "Extended European Search Report," issued in connection with European application No. 18945367.3 dated Jul. 22, 2022, p. 9.

David Manners, "QuickLogic introduces multi-core EOS sensor hub," Jul. 30, 2015 (Jul. 30, 2015), XP055942387, Retrieved from the Internet: URL:https://www.electronicsweekly.com/news/products/sensors-products/quicklogic-introduces-multi-core-eos-sensor-hub-2015-07/ [retrieved on Jul. 13, 2022], 4 pages.

* cited by examiner

| Domain | Feature | Host Controller 102 | ULP Processor 110 | VCD Offload Engine 104 | VP Offload Engine 106 | Audio Offload Engine 108 |
|---|---|---|---|---|---|---|
| Basic Sensor Data | Always running sensors | Driver | Sampling | | | |
| | Other physical sensors | Driver | | | | |
| | Always running sensor logic | Wrapper | Sensor logic | | | |
| | Other sensor logic | Sensor logic | | | | |
| Location Data | Location sensors | Driver | | | | |
| | Location logic | Location logic | | | | |
| Vision Data | Imaging hardware | Wrapper | | Driver | | |
| | Vision detection logic | Wrapper | | Vision logic | | |
| | Vision recognition logic | Vision logic | | | DSP and CNN acceleration | |
| Audio Data | Raw audio recognition logic | | Audio logic | | | |
| | Accurate audio recognition logic | Wrapper | | | | Audio logic and DNN acceleration |
| Platform Services | PWM, Crypto, BLE | Service | | | | |

FIG. 2

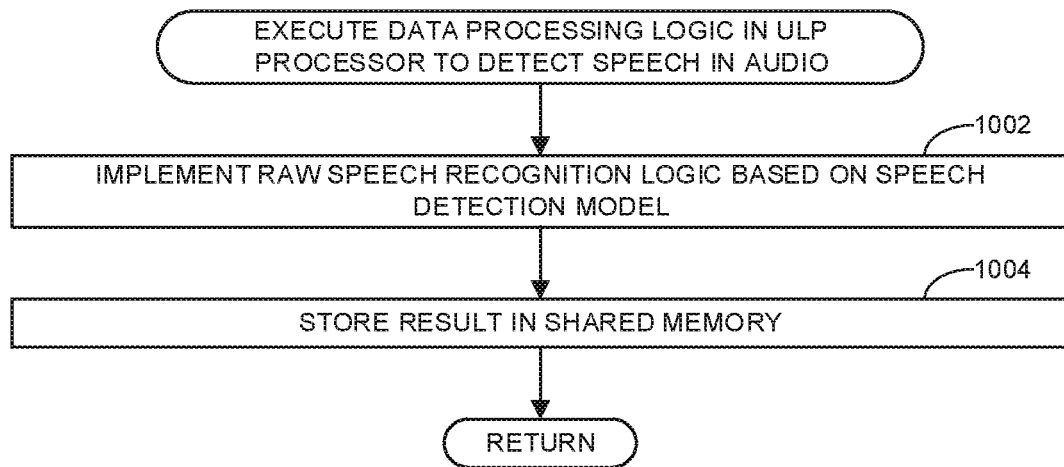

METHODS AND APPARATUS TO IMPLEMENT ALWAYS-ON CONTEXT SENSOR HUBS FOR PROCESSING MULTIPLE DIFFERENT TYPES OF DATA INPUTS

RELATED APPLICATIONS

This patent claims priority to International PCT Application No. PCT/CN2018/125996, which was filed on Dec. 31, 2018, and which is hereby incorporated herein by reference in its entirety.

FIELD OF THE DISCLOSURE

This disclosure relates generally to sensor technology, and, more particularly, to methods and apparatus to implement always-on context sensor hubs for processing multiple different types of data inputs.

BACKGROUND

Many processors in modern electronic devices offload tasks relating to the collection and/or processing of sensor data to a sensor hub to reduce power consumption and achieve greater performance efficiency. A sensor hub is a microcontroller, coprocessor, and/or digital signal processor (DSP) designed specifically to handle the processing of sensor data in a more efficient manner than typical application processors (e.g., central processing units (CPUs)). With the development of increasingly power-efficient technologies, some sensor hubs are fabricated to operate in an always-on state in which the always-on sensor hub remains active to aggregate and analyze sensor data even when the associated electronic device is in a low power (e.g., sleep) mode.

BRIEF DESCRIPTION OF THE DRAWINGS

FIG. 2 is table outlining an example workload partition of various sensor and/or other hardware drivers and corresponding data processing logic between the different cores of the example context sensor hub of FIG. 1

FIG. 8-15 are flowcharts representative of example machine readable instructions which may be executed to implement the example context sensor hub of FIGS. 1 and/or 3.

The figures are not to scale. In general, the same reference numbers will be used throughout the drawing(s) and accompanying written description to refer to the same or like parts.

DETAILED DESCRIPTION

Figure 1:
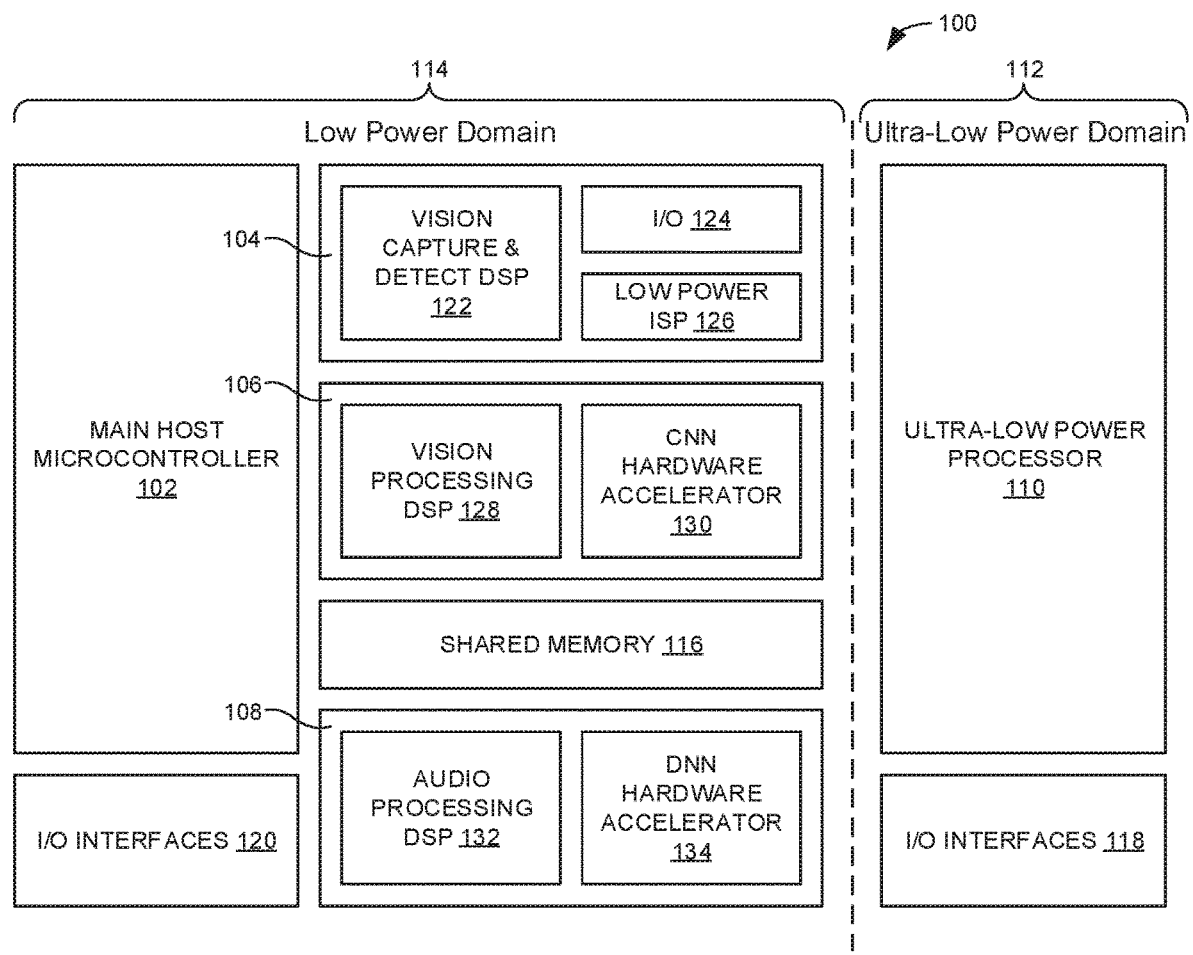
FIG. 1 is a block diagram illustrating an example hardware architecture of an example context sensor hub constructed in accordance with teachings disclosed herein.

Sensors hubs are specifically designed to integrate and process sensor data output from one or more sensor devices in an electronic device in a power efficient manner. However, many known sensor hubs are capable of relatively limited types of data processing based on the particular types of sensor data collected from a relatively limited set of sensor devices. For example, some sensor hubs are limited to processing sensor data from basic sensor devices such as, accelerometers, gyroscopes, magnetometers, proximity sensors (infrared (IR) sensor), ambient light sensors, etc. In such circumstances, advanced data processing of other types of sensor data may be implemented on other chips dedicated for that purpose. For example, some known dedicated processing chips are specifically designed to process location data obtained from suitable sensor device (e.g., a global navigation satellite system (GNSS) sensors, Wi-Fi receivers, Bluetooth receivers, cellular network receivers, etc.). Other dedicated processing chips are specifically designed for audio processing of audio data obtained from an audio sensor device (e.g., a microphone). Some such audio processing chips implement a deep neural network (DNN) to enable speech detection (e.g. identify words spoken by a person) and/or voice recognition (e.g., identify a speaker based on their voice). Still other dedicated processing chips are specifically designed for processing of image data obtained from an image sensor (e.g., a camera). Some such image processing chips implement a convolution neural network (CNN) to enable object detection (e.g. detect the presence of and/or location of an object (e.g., a face) within an image) and/or object recognition (e.g., identify and/or distinguish a detected object from other objects (e.g., recognize a particular person based on their face)).

Different sensor hubs and/or other dedicated chips are typically used to process different types of data to increase the performance and power efficiency with which the particular type(s) of data are processed. That is, while it may be possible to process image data using a digital signal processor (DSP) designed specifically for audio processing, the process will be less efficient than processing the image data using an image signal processor (ISP) specifically designed for image processing. Using efficient hardware and/or firmware designs for sensor hubs is especially important when the sensor hubs are to be implemented in an always-on mode. As used herein, a sensor hub or other data processing chip is defined to be always-on when the hub gathers, processes, and/or responds to sensor data output by one or more sensors of an electronic device in substantially real-time regardless of whether the electronic device is in a sleep or idle mode and/or performing operations unrelated to the collection of the sensor data.

Teachings disclosed herein pertain to the implementation of always-on context sensor hubs. As used herein, the term "context sensor hub" is used to distinguish the example hubs disclosed herein relative to traditional sensor hubs. More particularly, the term context is defined herein to refer to higher level data processing determinations relating to the context of an associated electronic device beyond the basic sensor data processing determinations of traditional sensor hubs. Basic sensor data processing relate to motion, orientation, and lighting (e.g., based on accelerometers, gyroscopes, magnetometers, ambient light sensors, etc.). Specifically, the context associated with an electronic device may include the location of the electronic device, the activity and/or behavior of a user of the electronic device, applications running on the electronic device, etc. Thus, in addition to providing basic sensor data processing for motion detection, orientation detection, lighting detection, and the like, example context sensor hubs disclosed herein also enable context processing activities such as location detection, vision analysis (e.g., image processing, object detection/recognition such as facial recognition), audio analysis (e.g., speech detection, voice recognition), as well as the execution of certain applications installed on the electronic device and/or the implementation of certain platform services based on the above context-based determinations.

Furthermore, as always-on components, example context sensor hubs disclosed herein are capable of performing both the basic sensor data processing and the higher level context-based data processing and subsequent execution of certain applications even when the associated electronic device is in a sleep or idle mode. To enable an always-on implementation that does not consume an inordinate amount of battery power, the data processing of examples disclosed herein is be performed in an efficient low power manner. Accordingly, example always-on context sensors hubs disclosed herein are implemented as a system on a chip (SOC) with multiple processor cores that are specifically designed to handle the processing of the different types of sensor data mentioned above. Having separate cores dedicated to different functionalities enables the processing of the different types of data in an efficient manner, thereby saving power. Furthermore, examples disclosed herein enable different ones of the cores to be put to sleep when not currently being used and activated or awakened when the particular functionality offered by the cores is needed. Thus, while the cores are considered always-on as the term is defined herein (e.g., can be active and operating when the associated electronic device is in a sleep or idle mode), not all of the cores are necessarily always powered. More particularly, the separate cores are associated with one of two power domains. A first power domain is referred to herein as the ultra-low power domain, which is defined herein as operating at or below approximately 1 mW. A second power domain is referred to herein as the low power domain, which is defined herein as operating between approximately 1 mW and 20 mW. In this context, approximately means+/−0.5 mW. The ultra-low power domain is the baseline power for examples disclosed herein. In some examples, at least one core operates in the ultra-low power domain and is always powered (e.g., never power gated) when an associated electronic device is not fully turned off. By contrast, other cores operate in the low power domain and remain asleep or deactivated unless additional computational capacity is needed whereupon they may be woken up. In some examples, these low power cores are awakened by the ultra-low power core in response to an event detected based on sensor data being monitored and/or processed by the ultra-low power core. In some examples, one low power core may wake up a different low power core.

The complexity arising from separate cores with separate functionalities that can interact with one another as outlined above presents a number of challenges compared with simpler sensor hubs dedicated to a specific purpose. Among other things, distributing functionality across multiple cores makes it difficult to control the separate cores and/or enable their efficient interaction (e.g., to wake a particular core up when needed and/or to put a particular core to sleep when no longer need). Accordingly, some example context sensor hubs disclosed herein include one core that serves as a host or main controller that handles a substantial portion of the firmware logic for the various functionalities provided by the hub with the other cores serving as offload engines with specific firmware logic and/or hardware to implement the particular tasks or functions for which they are designed.

Another challenge with having multiple cores with function-specific hardware and/or firmware is that it can create complexity for an original equipment manufacturer (OEM) incorporating the example context sensor hubs into suitable electronic devices. In particular, because each core is designed for a different purpose, each core is associated with a different application programming interface (API) making it difficult for an OEM to develop code that can take advantage of the different functionalities offered by the different cores and/or customize them for particular usages. In some examples disclosed herein, these challenges are overcoming by including an API proxy in the host controller core to pass instructions, commands, configuration parameters, and the like, to the other cores without the OEM having to code to the particular APIs of the other cores. Furthermore, in some examples, the host controller core includes firmware that provides support for a user-friendly programming language (e.g., Java) to further simplify customization and configuration of the example context sensor hubs.

In some examples, the context sensor hubs disclosed herein may be implemented as a companion die (e.g., co-processor) to an application processor of an electronic device or as a standalone processor. To enable the standalone functionality, example context sensor hubs include a runtime environment (e.g., a Java runtime environment) provided within the firmware of one of the cores (e.g., the host controller). The runtime environment enables the execution of any suitable applications. Furthermore, in some examples, such applications may be dynamically loaded. Other advantages of the example context sensor hubs disclosed herein will become apparent in view of the following detailed description of the drawings.

FIG. 1 is a block diagram of an example hardware architecture for an example context sensor hub 100 constructed in accordance with teachings disclosed herein. In the illustrated example, the context sensor hub 100 includes five separate processor cores including a main host microcontroller 102 (referred to herein as the host controller 102 for short), a vision capture and detect (VCD) core 104, a vision processor core 106, an audio processor core 108, and an ultra-low power (ULP) processor core 110. As represented in the example of FIG. 1, the ULP processor core 110 operates within an ultra-low power domain 112, while the other cores operate within a low power domain 114. The example context sensor hub 100 also includes a shared memory 116 that operates within the low power domain 114. Further, in some examples, one or more input/output (I/O) interfaces 118 are provided in the ultra-low power domain 112 while one or more other I/O interfaces 120 are provided in the low power domain 114. The I/O interfaces 118, 120 enable the context sensor hub 100 to interface with and receive sensor data from sensors or other hardware peripherals of an associated electronic device. Some example sensors include an accelerometer, a gyroscope, a magnetometer, an ambient light sensor, a proximity sensor (e.g., an IR sensor), a microphone, location sensors (e.g., GNSS sensor, Wi-Fi receiver, etc.), an image sensor (e.g., a camera), etc.

The example ULP processor core 110 provides basic functions for always-on sensor data monitoring and analysis. In some examples, the ULP processor core 110 is never power gated such that it is always powered when power is provided to the hub 100. That is, the ULP processor core 110 is always powered so long as the associated electronic device containing the hub 100 is not fully turned off, regardless of whether the electronic device is in a sleep or lower power idle mode. In some examples, the ULP processor core 110 performs basic processing on outputs of one or more sensors to detect events that may trigger the activation of one or more of the other cores 102, 104, 106, 108 in the low power domain 114 to perform additional data processing and analysis.

General management of the context sensor hub 100 is provided by the example host controller 102. Thus, in some examples, when a user (e.g., an OEM) seeks to configure the sensor hub 100, the user interfaces directly with the host controller 102 and then the host controller 102 may pass configuration data onto the other cores. Further, in some examples, most of the drivers for sensors and/or other hardware peripherals monitored by the sensor hub 100 are included on the host controller. However, some sensor drivers may be offloaded to one or more of the other cores. For example, the sampling of sensors that are always being monitored (e.g., accelerometer, gyroscope, etc.) may be implemented directly by the ULP processor core 110 to maintain such operations in the ultra-low power domain 112 for increased efficiency. Other computations that need more power but are not overly intensive or involve specialized digital signal processing instructions may be implemented directly by the host controller 102. Example computations that may be performed directly on the host controller 102 include location detection (e.g., geographic location detection to identify GPS coordinates, latitude and longitude, etc.).

In the illustrated example, the host controller 102 offloads more computationally intensive tasks to one or more of the three other cores 104, 106, 108 (collectively referred to herein as offload engines). As shown in FIG. 1, the VCD offload engine 104 includes a VCD digital signal processor (DSP) 122, an I/O interface 124, and a low power image signal processor (ISP) 126. The I/O interface 124 is to communicate (e.g., interface) with a camera for capturing images. The ISP 126 facilitates the capturing of such images that may then be processed by the VCD DSP 122. The example VP offload engine 106 includes a VP DSP 128 specifically designed to perform computationally intensive vision analysis such as, for example object (e.g., facial) recognition. The VP offload engine 106 also includes a convolution neural network (CNN) accelerator 130 to facilitate object recognition processing. As shown in the illustrated example, there are two separate offload engines or cores associated with vision analysis including the VCD offload engine 104 and the VP offload engine 106. These two engines are separated because object recognition (performed by the VP offload engine 106) is more computationally intensive than object detection and/or other basic image processing performed by the VCD offload engine 104. By separating the functionalities into separate cores, performance efficiencies, and corresponding power efficiencies, may be achieved. However, in some examples, all vision processing may be performed via a single core.

Finally, as shown in FIG. 1, the audio offload engine 108 includes an audio processing DSP 132 specifically designed to perform computationally intensive audio processing and analysis such as, for example, speech detection and/or voice recognition. The audio offload engine 108 also includes a deep neural network (DNN) accelerator 134 to facilitate speech detection and/or voice recognition processing.

As mentioned above, most of the drivers for the sensors monitored by the context sensor hub 100 are included in the host controller 102 as the general manager for the operations of the context sensor hub 100. Further, in some examples, most of the data processing logic to analyze and/or process sensor data is also present in (e.g., hardware) and/or executed by (e.g., software and/or firmware) the host controller 102, except where specific tasks are offloaded to a different core of the hub 100. In some examples, the host controller 102 includes a wrapper for sensor hardware drivers and/or the data processing logic of other cores so that all drivers and logic are represented on and/or can be called from the host controller 102. This significantly simplifies the ability of users (e.g., OEMs) in configuring the context sensor hub 100 because they do not need to code on each core individually but merely need to code on the host controller 102, which can then pass information to the other cores as needed and/or call the functionality provided by the other cores.

FIG. 2 provides a table 200 outlining an example workload partition of various sensor and/or other hardware drivers and data processing logic between the various cores 102, 104, 106, 108, 110 to achieve always-on functionality that meets suitable computational loads while also improving power efficiency. A first column 202 identifies different type of domains corresponding to different types of sensor data and/or associated functionalities provided by the example context sensor hub 100. As used herein, the tern sensor data refers to both output signals of physical sensors monitored by the hub 100 as well as the output or results of subsequent analysis and/or subsequent processing of such output signals. As shown in the table of 200 of FIG. 2, the different domains or types of sensor data include a basic sensor data domain 204, a location data domain 206, a vision data domain 208, and an audio data domain 210. An additional platform services domain 212 is also represented in the table 200 of FIG. 2. The platform services are not sensor data as defined above but correspond to additional functions and/or services that may be triggered by, operate upon, and/or implemented in response to sensor data.

The second column 214 of the table 200 defines different features associated with the different domains identified in the first column 214. The features associated with the different types of sensor data 204, 206, 208, 210 correspond to either (1) physical sensors and/or other hardware peripherals that may be used to provide sensor data for processing and analysis by the context sensor hub 100, or (2) sensor data processing logic that defines procedures or operations to analyze outputs of the physical sensors and/or the results produced by the analysis of other sensor data processing logic. The features corresponding to the platform services 212 shown in the table 200 of FIG. 2 provide example services that may be implemented by the context sensor hub 100.

The remaining five columns 216, 218, 220, 222, 224 in the table 200 of FIG. 2 respectively correspond to the host controller 102, the ULP processor core 110, the VCD offload engine 104, the VP offload engine 106, and the audio offload engine 108. The cells within these five columns 216, 218, 220, 222, 224 of the table 200 of FIG. 2 define the distribution of workload between the different cores 102, 104, 106, 108, 110 associated with the different features (e.g., sensors, sensor logic, and services) identified in the second column 214. For example, in connection with the basic sensor data domain 204, there are two types of sensors including always running sensors and other physical sensors. As sued herein, always running is defined to mean always powered when power is available (e.g., the associated electronic device is not fully turned off). By contrast, always-on is defined herein to mean capable of operating when an associated is in a lower power, idle, or sleep mode. Thus, a component may be always-on (capable of operating) but not necessarily always running (always powered) if the component may or may not be operating when an associated electronic device is in a low power mode. Thus, in the table 200 of FIG. 2, sensors that are always running refer to sensors that are always powered to output sensor data whenever an associated electronic device is powered, whether or not the electronic device is in a sleep or idle mode. By contrast, the other physical sensors may be powered on or off as needed when the electronic device is in a sleep or idle mode and, thus, may be considered always-on. Example sensors that may be implemented as always running or at least as always-on (but not necessarily always running) include an accelerometer, a gyroscope, a magnetometer, an ambient light sensor, a proximity sensor (e.g., an IR sensor), and a microphone. As shown in FIG. 2, drivers for both always running sensors and other sensors are included in and/or executed in the host controller 102. However, the sampling for the always on sensors is offloaded to the ULP processor core 110 to save power because the ULP processor core is the only core operating in the ultra-low power domain as outlined above. The basic sensor data domain 204 is also associated with two types of sensor data processing logic including always running sensor logic and other sensor logic. As shown in table 2 of FIG. 2, the other sensor logic is executed directly on the host controller 102. By contrast, the always running sensor logic is executed on the ULP processor core 110. However, the host controller 102 includes a wrapper associated with the always running sensor logic of the ULP processor core 110.

The features associated with the location data domain 206 include location sensors and location logic. Example location sensors include GNSS sensors, Wi-Fi receivers, cellular network receivers, Bluetooth receivers, etc. In this example, both the drivers for the location sensors and the location logic used to analyze and process location data produced by the location sensors are executed by the host controller 102.

The features associated with the vision data domain 208 include imaging hardware. In some examples, the imaging hardware includes an image signal processor (e.g., the ISP 126 of FIG. 1) and a camera. As shown in FIG. 2, the drivers for the imaging hardware are on the VCD offload engine 104. However, the host controller 102 includes a wrapper associated with the drivers contained in the VCD offload engine 104 to enable the host controller 102 to offload tasks associated with the capturing of images to the VCD offload engine 104. The features associated with the vision data domain 208 also include vision detection logic and vision recognition logic. In this example, the vision detection logic is in the VCD offload engine 104 with a corresponding wrapper in the host controller 102 to enable offloading of object detection tasks to the VCD offload engine 104. By contrast, the vision recognition logic is associated with the host controller 102. However, the host controller 102 may offload digital signal processing and CNN acceleration to the VP offload engine 106.

The features associated with the audio data domain 210 include raw audio recognition logic and accurate audio recognition logic. In some examples, the raw audio recognition logic performs a course keyword recognition process to detect when a user says a keyword to wake up other functionality of an associated electronic device. In some examples, the raw audio recognition logic uses relatively small processing capacity to save power by being implemented by the ULP processor core 110. The relatively small computational burden of the raw audio recognition logic results in a relatively large error rate. However, in some examples, the audio logic is designed so that most errors are false positives rather than false negatives. Once the keyword is detected using the raw audio recognition logic, the ULP processor core 110 wakes up or activates the audio offload engine 108 to implement the accurate audio recognition logic along with DNN acceleration to confirm whether the raw audio recognition was correct or a false positive. In this example, the host controller 102 includes a wrapper associated with the accurate audio recognition logic contained in the audio offload engine 108.

The example features associated with the platform services domain 212 include pulse width modulation (PWM) control to, for example, flash a light emitting diode (LED), cryptographic security to, for example, authenticate dynamically loaded content into the firmware of the sensor hub 100, and Bluetooth Low Energy (BLE) communications. In this example, all of the platform services (whether hardware circuitry based, firmware based, and/or software based) are supported within the host controller 102.

As shown in the table 200 of FIG. 2, with the exception of the raw audio recognition logic, all hardware drivers and all sensor data processing logic are either within the host controller 102 or represented in the host controller 102 through a wrapper. As a result, all functionality provided by the context sensor hub 100 may be controlled, managed, and/or configured through the host controller 102. Thus, OEMs do not need to code directly to any of the offload engines 104, 106, 108, or the ULP processor core 110, thereby significantly simplifying a developer's user experience.

Figure 3:
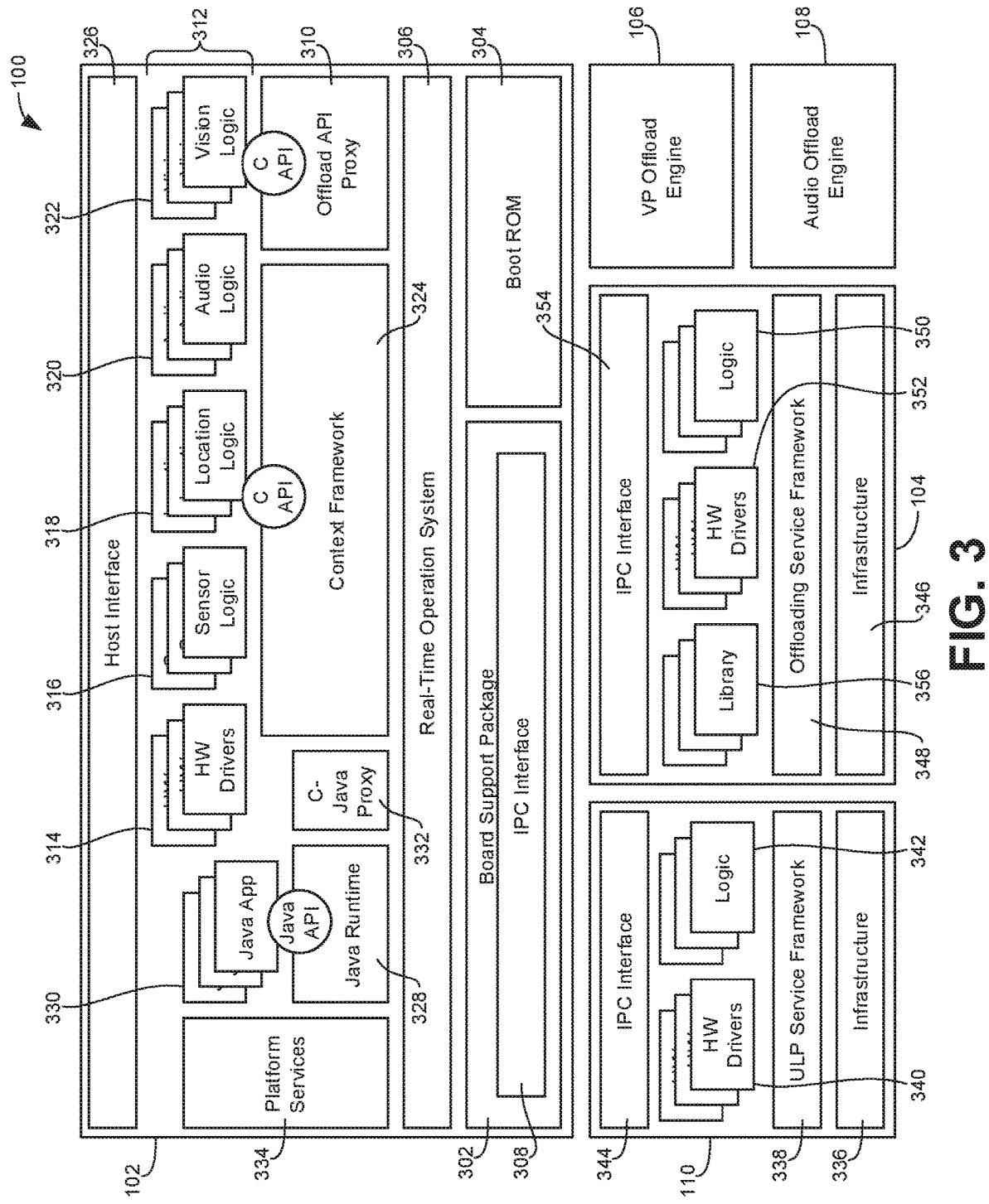
FIG. 3 is a block diagram illustrating an example firmware architecture of the example context sensor hub of FIG. 1.

FIG. 3 is a block diagram illustrating an example firmware architecture of the example context sensor hub 100 of FIG. 1 as it relates to the example hardware architecture shown in FIG. 1. While the VP offload engine 106 and the audio offload engine 108 are represented in the illustrated example, details of their firmware structure have been omitted for the sake of simplicity. However, the firmware architecture for both the VP offload engine 106 and the audio offload engine 108 is substantially similar to the firmware architecture of the VCD offload engine 104. Although FIG. 3 is described in terms of firmware, in some examples, one or more aspects of FIG. 3 may additionally or alternatively be implemented as hardware.

As shown in the illustrated example of FIG. 3, the host controller 102 includes basic infrastructure such as a board support package (BSP) 302, boot read-only memory (ROM) 304, and a real-time operating system (RTOS) 306. Unlike known sensor hubs, the example context sensor hub 100 also includes an interprocess communication (IPC) interface 308 within the BSP 302 of the host controller 102. The IPC interface 308 enables the host controller 102 to communicate with the offload engines 104, 106, 108 and the ULP processor core 110 using IPC techniques. IPC techniques may be hardware-centric. As a result, IPC techniques are not particularly suited as an application programming interface (API) for offloading particular computational tasks to different processor core circuitry (e.g., the different processing cores) as in the case of the context sensor hub 100. Accordingly, in some examples, the architecture of the host controller 102 includes an offload API proxy 310. The example API proxy 310 is based on IPC techniques but provides more meaningful API functionality for offloading different computational tasks. As an example, the host controller 102 may execute vision logic that calls the API proxy 310 to offload a particular image processing task (e.g., image cropping, image scaling, etc.) to the VP DSP 128 (FIG. 1) of the VP offload engine 106. Further, the vision logic of the host controller 102 may call the API proxy 310 a second time to open and run a CNN model on the cropped image for object recognition. In some examples, the API proxy 310 passes this request to the VP offload engine 106 to perform the object recognition using the VP DSP 128 and the CNN accelerator 130. Passing commands from the host controller 102 through the API proxy 310 to the other cores of the context sensor hub 100 in this manner simplifies a developer's ability to configure, customize, and/or control the context sensor hub 100 because the developer only needs to communicate directly with the host controller 102, rather than with each specific core to be utilized.

As shown in FIG. 3, the example architecture of the host controller 102 includes a plurality of sensor data sources 312. As used herein a sensor data source corresponds either to the sensor hardware drivers associated with physical sensors that output raw sensor data or to data processing logic that analyzes or processes the sensor data. In the illustrated example of FIG. 3, the sensor data sources 312 includes sensor hardware drivers 314 and sensor logic 316, either or both of which may be implemented in firmware. Unlike traditional sensor hubs that are limited to a relatively specific use, the example context sensor hub 100 of this example includes the ability to aggregate and process context-based information as well. Accordingly, in this example, other sensor data sources 312 in the host controller 102 include location logic 318, audio logic 320, and vision logic 322. As mentioned above, in connection with FIG. 2, some of the sensor data sources 312 may be executed directly in the host controller 102. However, in some examples, at least some of the sensor data sources 312 represented in the host controller 102 may be a wrapper with the actual drivers and/or sensor data processing logic of one or more of the offload engines 104, 106, 108, and/or the ULP processor core 110.

The example host controller 102 includes a context framework 324 that serves as a runtime environment for the sensor data sources 312 (e.g., the sensor hardware drivers 314, the sensor logic 316, the location logic 318, the audio logic 320, and/or the vision logic 322) and handles the data flow and control flow of the sensor data sources 312. The context framework also handles the data flow and control flow to and from a host interface 326. The host interface 326 interfaces with an application processor (AP) of an associated electronic device (e.g., smartphone, tablet, PC, etc.) to support operating system (OS) integration. As described more fully below, in some examples, the context sensor hub 100 may be implemented as a standalone processor (rather than as a co-processor to an AP). In some such examples, the host interface 326 may be omitted.

The example context framework 324 includes a number of differences and additional capabilities relative to a typical framework of a traditional sensor hub. As already mentioned, rather than merely providing an API for basic sensor data (e.g., the sensor hardware drivers 314 and the sensor logic 316), the context framework 324 provides an extension to the API support for the context-based location, audio, and vision logic 318, 320, 322. The API enables the location, audio, and vision logic to be treated and/or conceptualized (for purposes of configuration, customization, and/or control) as sensors (e.g., virtual sensors) in a similar manner that traditional sensor hubs treat sensor hardware drivers (e.g., physical sensors) and associated sensor logic. Furthermore, the API enables wrappers for drivers and/or logic located on separate cores to be treated and/or conceptualized as sensors in a similar manner to traditional sensor hubs.

Many known sensor hubs run all sensor firmware in a single thread. By contrast, in some examples, the context framework 324 disclosed herein supports multiple threads to enable separate sensor data processing to occur concurrently. This can be important in situations where computationally intensive operations are being performed (e.g., vision detection and/or recognition) that can take a relatively longer period of time relative to simpler operations, thereby causing delays if there was only a single thread.

Unlike many known sensor hubs, the example context framework 324 of the context sensor hub 100 provides customization and/or configurability for sensor parameters. That is, rather than building a sensor hub with fixed configurations, the context framework 324 enables a developer to flexibly define and/or adjust sensor parameters for particular usages. This is important because some context based sensors (e.g., a camera) and/or sensor data logic (e.g., speech detection) include a number of configuration parameters (e.g., camera resolution, audio sampling frequency, etc.) that should be variable for better performance depending on the particular situation.

In some examples, the execution of some of the more computationally intensive context-based processing logic uses large blocks of reference data. For example, the location logic may involve referencing a Wi-Fi fingerprint database to determine location based on Wi-Fi signals. As another example, the vision logic used for facial recognition may involve referencing a database of user features for face recognition. In some examples, the context framework 324 enables such large blocks of data to be loaded from an AP (e.g., via the host interface 326) and/or written back to the AP because the local memory (e.g., the shared memory 116) may be insufficient.

The context-based processing logic relating to vision detection and/or recognition and/or to audio detection and/or recognition is only as accurate as the artificial intelligence (AI) models used in performing the analysis. However, in examples with limited shared memory 116 (e.g., limited to 10.5 MB in some examples) and no direct access to the system memory of an associated electronic device, the data processing models are relatively limited. The example context framework 324 enables the dynamic updating of models to expand the capability of the AI analysis. For example, with 1 MB of available memory, an automatic speech recognition process may use a model with 50 keywords, which corresponds to approximately 922 KB or memory. In some examples, the context framework 324 enables the dynamic loading of a different model, containing 50 different keywords, from the AP to the shared memory 116 of the context sensor hub 100 to update or replace the first model, thereby effectively extending the number of recognizable keywords to 100 without increasing memory size. In some examples, the particular model used in any given moment may depend on the circumstance as determined from an analysis of other sensor data. For example, a first speech recognition model with keywords expected when a person is driving may be loaded when the person is detected in a car, whereas a second speech recognition model with keywords expected when a person is home may be loaded when the person is detected at home. As another example, an object recognition model for 20 objects is approximately 1.8 MB. To save memory size, in some examples, the 20 objects may be separated into two or more categories (e.g., indoor versus outdoor objects) to form multiple smaller models of fewer objects that can be individual selected for dynamic loading based on when detected circumstances correspond to the particular category of objects.

As mentioned above, the example context framework 324 manages and/or controls the data flow and control flow for the sensor data sources 312 (e.g., all the data sources) regardless of whether the driver and/or logic associated with a particular sensor data source 312 is at the host controller 102 or on a different core (but represented by a wrapper in the host controller 102). To manage the offloading of computational tasks and the proper flow of data between different cores and the associated sensor data sources, the example context framework 324 maintains a data structure that defines the control and data flow relationships between different sensor data sources as well as the location (e.g., the particular core) of the driver and/or logic for each sensor data source. An example sensor tree 400 representative of such relationships is shown in FIG. 4.

As mentioned above, the example context framework 324 enables the sensor data processing logic to be represented or conceptualized as a sensor. To distinguish data processing logic that processes sensor data output by hardware sensors from the drivers that enable the hardware sensors to collect the output data, each data processing logic represented in the sensor tree 400 is referred to as a "virtual" sensor while the drivers are referred to as "physical" sensors. Thus, virtual sensors and physical sensors shown in the sensor tree 400 correspond to the sensor data sources 312 provided in the architecture of the host controller 102. In the illustrated example of FIG. 4, the sensor tree 400 represents two hardware drivers or physical sensors (e.g., physical sensor A 402 and physical sensor B 404) and four items of data processing logic or virtual sensors (e.g., virtual sensor A 406, virtual sensor B 408, virtual sensor C 410, virtual sensor D 412).

Along with the identification of the separate sensor data sources (whether virtual or physical sensors), the example sensor tree 400 includes an identifier indicating the particular core where the associated sensor data source (driver or data processing logic) is located. Thus, in the example sensor tree 400 of FIG. 4, physical sensor A, physical B, and virtual sensor D are all located on the VP offload engine 106; virtual sensor A is located on the ULP processor core 110; virtual sensor B 408 is located on the VCD offload engine 104; and virtual sensor C 410 is located on the host controller 102. A virtual sensor may be software executed on the corresponding core or hardware circuitry within the corresponding core to perform the corresponding functions.

Figure 4:
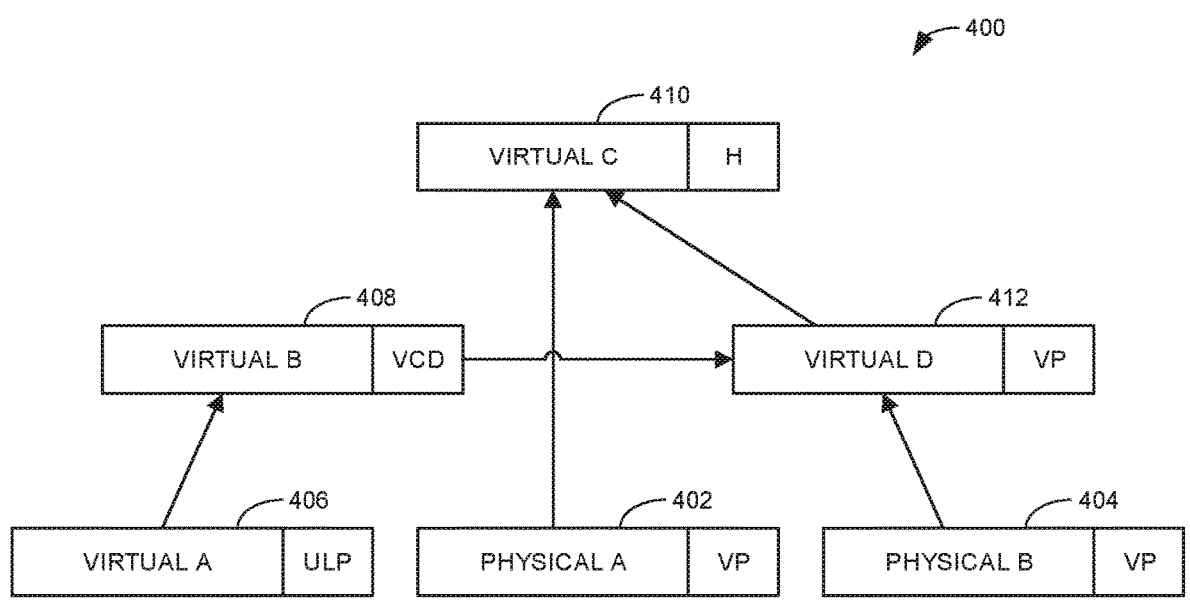
FIG. 4 illustrates an example sensor tree representative of configurations of example virtual and physical sensor data sources.

In the illustrated example of FIG. 4, the arrows represent the flow of data between the different sensors. In other words, the arrows represent the client-server relationships of the different sensors. For example, the results of executing virtual sensor A 406 are provided to virtual sensor B 408. Thus, virtual sensor A 406 is a server or supplier of data to virtual sensor B 408, which is a client of virtual sensor A. The results of virtual sensor B 408 are in turn provided to virtual sensor D 412, which, in turn, provides output results to virtual sensor C 410. Additionally, the output of physical sensor A 402 is provided to virtual sensor C 410, and the output of physical sensor B 404 is provided to virtual sensor D 412.

In some examples, the context framework 324 maintains the sensor tree 400 and/or any suitable data structure representing the identifiers, labels, and relationships in the sensor tree 400 to control and/or manage the operation of the context sensor hub 100. For example, the designation of the particular core corresponding to a particular sensor enables the example context framework 324 to determine when the host controller 102 and/or a different core may be deactivated to enter a sleep mode. In particular, in the example sensor tree 400 of FIG. 4, virtual sensor C 410 is the only sensor that is actually executed in the host controller 102. Therefore, if virtual sensor C 410 is open and running (e.g., the associated sensor data processing logic is currently processing sensor data), then the host controller 102 must be on or active. If, on the other hand, virtual sensor C 410 is not running (although it may be open (e.g., waiting for an event result from virtual sensor D)), the context framework 324 will check whether any other sensors in the sensor tree 400 are currently running on the host controller 102. If none of the running sensors are labelled as being in the host controller 102, the context framework 324 causes the host controller 102 to go to sleep.

The data flow represented in the sensor tree 400 of FIG. 4 also defines when particular cores are to be woken up from a deactivated state or sleep mode. For example, as noted above, virtual sensor C 410 (executed on the host controller 102) is a client of the physical sensor A 402 because the output of physical sensor A 402 is provided to virtual sensor C 410. Accordingly, in some examples, physical sensor A 402 and/or the output of physical sensor A 402 is defined as an event that triggers the host controller 102 to be woken up so that virtual sensor C 410 can receive and process the output. In the example sensor tree 400, physical sensor B 404 does not include any clients identified as being on the host controller 102. The only client of physical sensor B 404 is virtual sensor D 412. Both sensor B 404 and sensor D 412 are on the VP offload engine 106. Accordingly, an event associated with the output of physical sensor B 404 does not trigger the host controller 102 to be awoken. Rather, the results of executing virtual sensor B 408 directly pass to virtual sensor D 412 within the VP offload engine 106. Virtual sensor A 406 has a single client defined in the example sensor tree 400 corresponding to virtual sensor B 406. Inasmuch as the two virtual sensors 406, 408 are in different cores, the output result of the virtual sensor A 406 is configured as an event that triggers the VCD offload engine 104 to be activated to run virtual sensor B. However, because neither virtual sensor A 406 nor virtual sensor B 408 are on the host controller 102, there is no need to wake up or activate the host controller 102.

Returning to the illustrated example of FIG. 3, the architecture of the host controller 102 includes a Java runtime environment 328 to enable always-on applications corresponding to Java applets 330. In the illustrated example, all of the aspects implemented in the host controller 102, except for the Java runtime environment 328 and the Java applets 330 are implemented in the C programming language. Accordingly, in this example, the host controller 102 includes a C-Java proxy 332 to enable interactions between the Java runtime environment 328 and the context framework 324. In this manner, the Java applets 330 are able to open, close, configure, stream, and/or otherwise access any content inside the context sensor hub 100. In some examples, all aspects of the context sensor hub 100, except for the Java applets 330, are statically built. By contrast, the Java applets 330 may be dynamically loaded and unloaded. This can pose potential security threats if a Java applet contains malicious software. Accordingly, in some examples, the Java runtime environment 328 performs signature verification on the Java applets that are loaded or unloaded to the host controller 102 to block unauthorized applications. Further, the Java runtime environment 328 provides permission checking, memory isolation, and sandboxing for the Java applets 330. Therefore, the Java runtime environment 328 may provide more flexibility and simplicity in configuring and operating the context sensor hub 100 than would be possible if the hub was limited to static firmware.

The example Java applets 330 are applications that may perform any suitable function in an always-on mode. That is, the Java applets 330 may be triggered and/or executed when an associated electronic device is in a sleep or idle mode. As a specific example, in response to the VP offload engine 106 recognizing a particular gesture of a user, a Java applet 330 may use BLE signals to communicate with a smart home gateway of the user to turn on a light in the user's home or perform some other operation. Although a Java runtime environment 328 and Java applets 330 are shown in FIG. 3, any other runtime environment may alternatively be implemented to enable the execution of corresponding applications.

The example architecture of the host controller 102 shown in FIG. 3 includes platform services 334 that include any type of functionality or service that may be accessed and/or used by the Java applets 330 and/or other logic (e.g., the sensor data processing logic). Example services include PWM control, cryptographic services, BLE stack, etc.

FIG. 3 shows an example architecture for the ULP processor core 110 in less detail than for the host controller 102 for the sake of simplicity. As shown in the illustrated example, the architecture for the ULP processor core 110 includes a basic infrastructure 336 that includes infrastructure components such as, for example, a BSP, a RTOS, a scheduler, etc. The example architecture of the ULP processor core 110 also includes an example ULP service framework 338. The ULP service framework 338 has a purpose and function similar to the context framework 324 in the host controller 102 except that the ULP service framework 338 is limited to managing the ULP processor core 110. More particularly, in some examples, the ULP service framework 338 controls and/or manages sensor hardware drivers 340 and/or data processing logic 342 contained with the ULP processor core 110. As mentioned above in connection with FIG. 2, in some examples, the drivers 340 correspond to sensors that are always running (e.g., accelerometer, gyroscope, microphone, etc.) and the logic 342 corresponds to the logic that is to be always running (e.g., basic sensor logic and/or raw audio recognition logic). The example ULP processor core 110 includes an IPC interface 344 to enable communications with the host controller 102 via the IPC interface 308 of the host controller 102. In some examples, the context framework 324 in the host controller 102 provides configuration and/or control data to the ULP service framework 338 to facilitate the ULP service framework 338 in performing its proper functions. For instance, in some examples, the context framework 324 provides the sensor tree 400 or other corresponding data structure to the ULP service framework 338 to enable the ULP service framework 338 to determine when outputs associated with the hardware drivers 340 and/or the logic 342 are to serve as an event triggering the activation of a different core.

The example architecture for the VCD offload engine 104 is substantially similar to the architecture of the ULP processor core 110. Thus, as shown in FIG. 3, the VCD offload engine 104 includes a basic infrastructure 346, an offloading service framework 348 (similar to the ULP service framework 338 described above), data processing logic 350, sensor hardware drivers 352, and an IPC interface 354. A difference in the architecture between the ULP processor core 110 and the VCD offload engine 104 is that the logic 350 in the VCD offload engine 104 performs different computational tasks than the logic 342 in the ULP processor core 110. Similarly, the drivers 352 in the VCD offload engine 104 are associated with different hardware than the drivers 340 in the ULP processor core 110. Another difference between the ULP processor core 110 and the VCD offload engine 104 is that the VCD offload engine 104 includes one or more libraries 356 used by corresponding logic 350.

The example architecture for the VP offload engine 106 and the audio offload engine 108 are not represented in FIG. 2. However, in some examples, the architecture of these offload engines 106 is similar to the architecture shown for the VCD offload engine 104 with the exception that different hardware drivers, logic, and associated libraries are implemented in each.

While an example manner of implementing the context sensor hub 100 of FIG. 1 is illustrated in FIG. 3, one or more of the elements, processes and/or devices illustrated in FIG. 3 may be combined, divided, re-arranged, omitted, eliminated and/or implemented in any other way. Further, the example host controller 102 (including the example BSP 302, the example boot ROM 304, the example RTOS 306, the example IPC interface 308, the example offload API proxy 310, the example sensor data sources 312 (including the example sensor hardware drivers 314, the example sensor logic 316, the example location logic 318, the example audio logic 320, and/or the example vision logic 322), the example context framework 324, the example host interface 326, the example Java runtime environment 328, the example Java applets 330, the example C-Java proxy 332, and/or the example platform services 334), the example ULP processor core 110 (including the example basic infrastructure 336, the example ULP service framework 338, the example sensor hardware drivers 340, the example logic 342, and/or the example IPC interface 344), the example VCD offload engine 104 (including the example basic infrastructure 346, the example offloading service framework 348, the example logic 350, the example sensor hardware drivers 352, the example IPC interface 354, and/or the example libraries 356), the example VP offload engine 106, the example audio offload engine 108 and/or, more generally, the example context sensor hub 100 of FIG. 1 may be implemented by hardware, software, firmware and/or any combination of hardware, software and/or firmware. Thus, for example, any of the example host controller 102 (including the example BSP 302, the example boot ROM 304, the example RTOS 306, the example IPC interface 308, the example offload API proxy 310, the example sensor data sources 312 (including the example sensor hardware drivers 314, the example sensor logic 316, the example location logic 318, the example audio logic 320, and/or the example vision logic 322), the example context framework 324, the example host interface 326, the example Java runtime environment 328, the example Java applets 330, the example C-Java proxy 332, and/or the example platform services 334), the example ULP processor core 110 (including the example basic infrastructure 336, the example ULP service framework 338, the example sensor hardware drivers 340, the example logic 342, and/or the example IPC interface 344), the example VCD offload engine 104 (including the example basic infrastructure 346, the example offloading service framework 348, the example logic 350, the example sensor hardware drivers 352, the example IPC interface 354, and/or the example libraries 356), the example VP offload engine 106, the example audio offload engine 108 and/or, more generally, the example context sensor hub 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host controller 102 (including the example BSP 302, the example boot ROM 304, the example RTOS 306, the example IPC interface 308, the example offload API proxy 310, the example sensor data sources 312 (including the example sensor hardware drivers 314, the example sensor logic 316, the example location logic 318, the example audio logic 320, and/or the example vision logic 322), the example context framework 324, the example host interface 326, the example Java runtime environment 328, the example Java applets 330, the example C-Java proxy 332, and/or the example platform services 334), the example ULP processor core 110 (including the example basic infrastructure 336, the example ULP service framework 338, the example sensor hardware drivers 340, the example logic 342, and/or the example IPC interface 344), the example VCD offload engine 104 (including the example basic infrastructure 346, the example offloading service framework 348, the example logic 350, the example sensor hardware drivers 352, the example IPC interface 354, and/or the example libraries 356), the example VP offload engine 106, and/or the example audio offload engine 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example context sensor hub 100 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
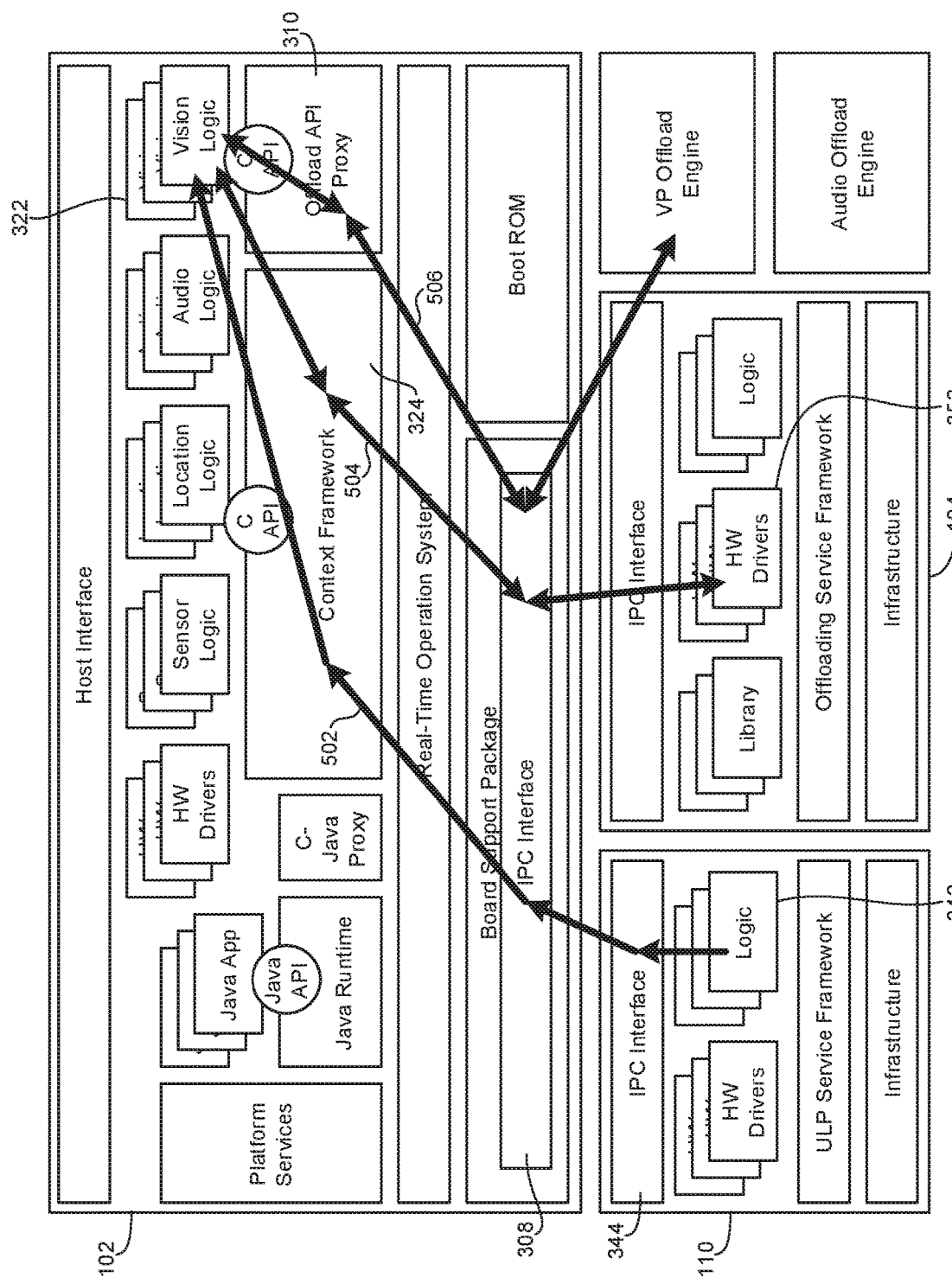
FIGS. 5-7 illustrate example stages of operation through the example firmware architecture of FIG. 3 to implement an always-on facial recognition procedure.
Figure 6:
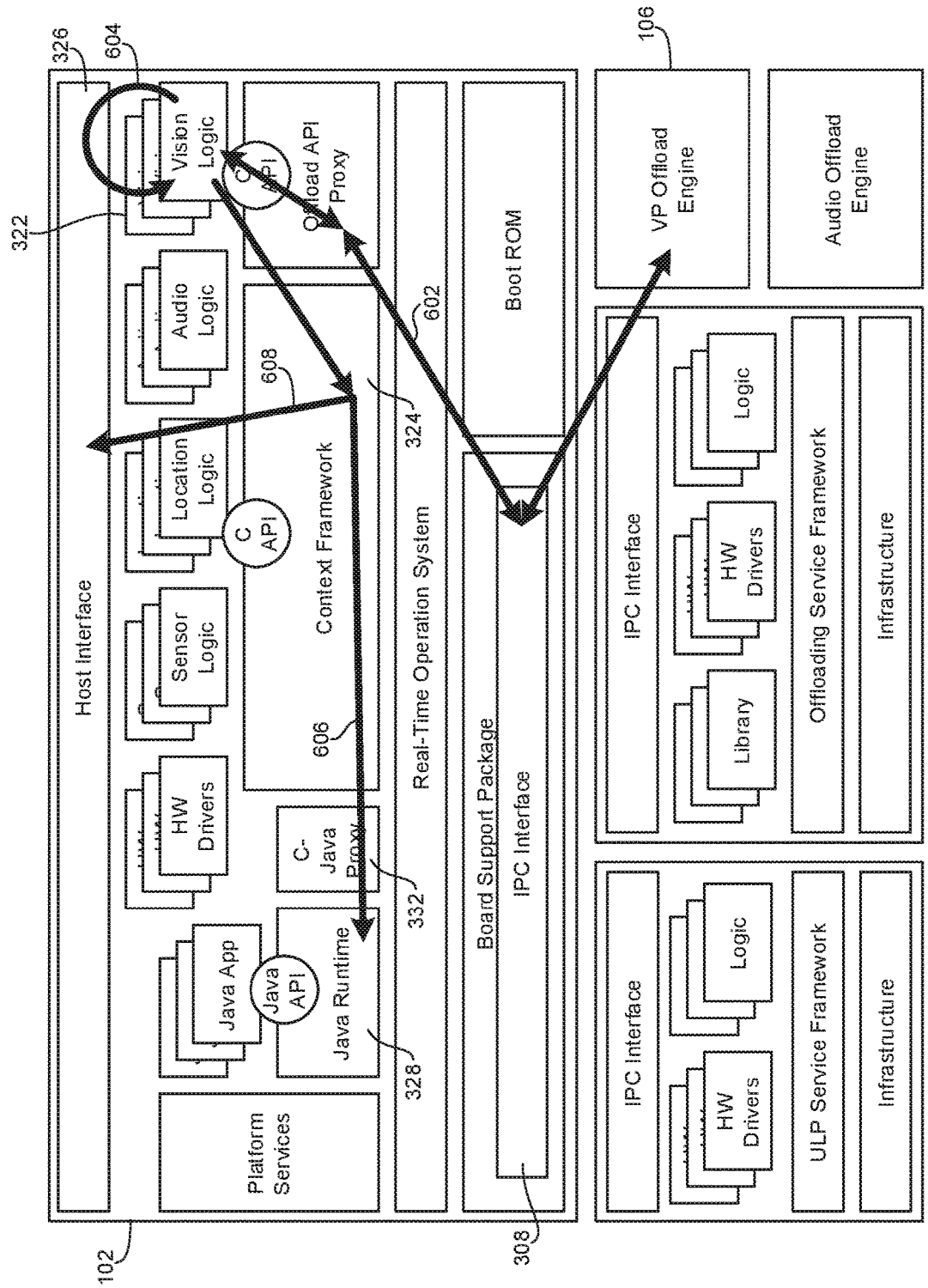
Figure 7:
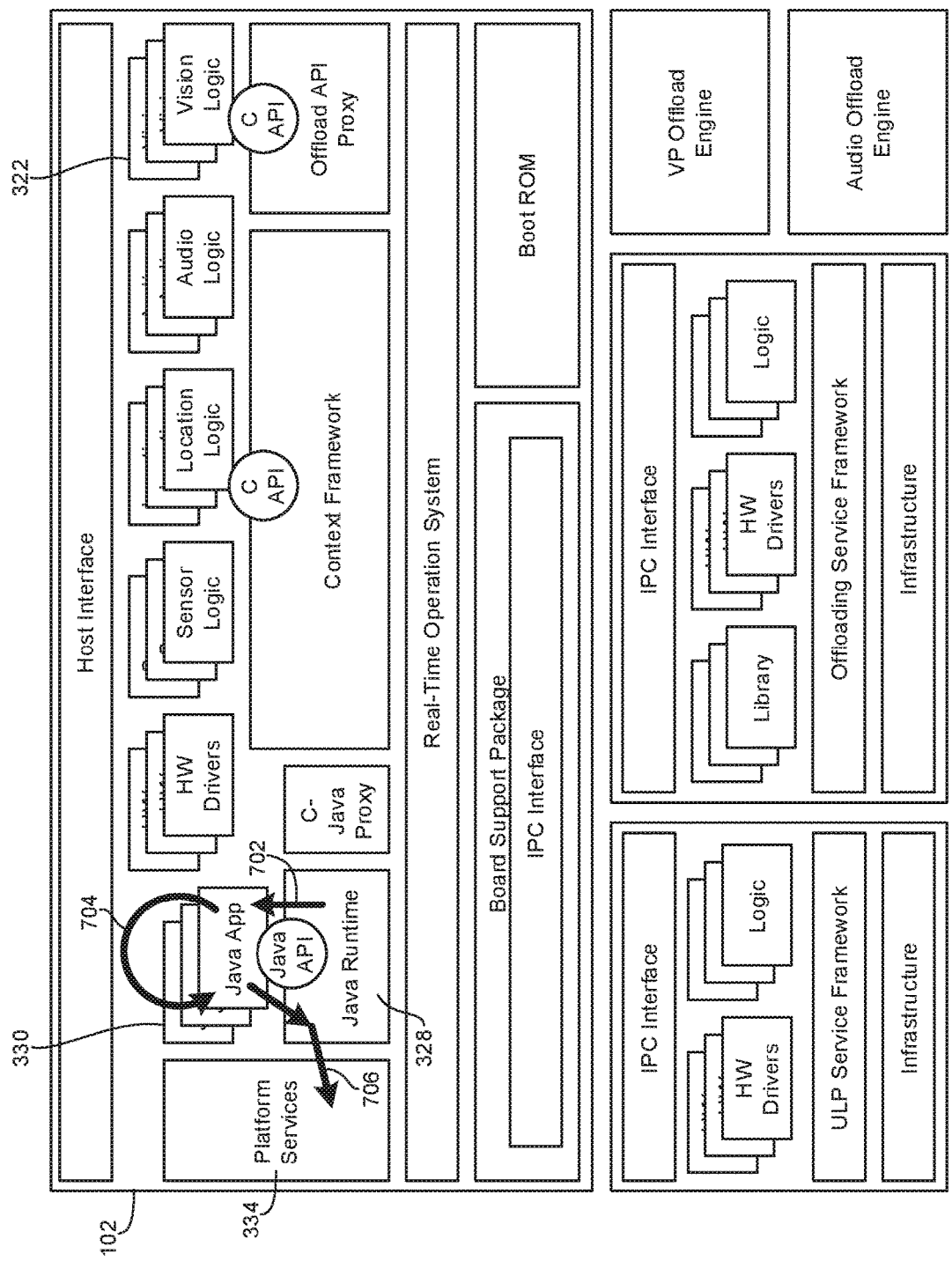

FIGS. 5-7 illustrate example stages of operation through the example architecture of FIG. 3 to implement an always-on facial recognition procedure. In this particular example, a first stage of operation 502 begins with the sensor data processing logic 342 in the ULP processor core 110 detecting a trigger event such as, for example, a pick up gesture identified based on motion data from an accelerometer and/or a gyroscope. In this example, the ULP processor core 110 wakes of the host controller via the IPC interfaces 308, 344 in the respective host controller 102 and ULP processor core 110. The context framework receives the event data and passes it to the vision logic 322 corresponding to facial recognition. In a second stage of operation 504, the vision logic 322 begins running on the host controller 102 and calls for a camera to be opened via the context framework 324. Accordingly, the context framework 324 opens the camera via the VCD offload engine 104 where the hardware driver 352 for the camera is located. At this point, the camera begins streaming image data. At a third stage of operation 506, with a captured image, the vision logic 322 calls offload API proxy 310 to offload image pre-processing to pre-process the image by down scaling via the VP offload engine 106. In some examples, the call to the API proxy includes an address in the shared memory where the unprocessed image is stored and a second address in the shared memory where the processed image is to be stored.

Moving to FIG. 6, at a fourth stage of operation 602, the vision logic 322 retrieves the pre-processed image from the shared memory and then calls offload API proxy 310 to offload facial recognition analysis to the CNN hardware accelerator 130 (FIG. 1) associated with the VP offload engine 106. In some examples, the call to the API proxy includes an address to where a CNN model is stored in the shared memory 116. The VP offload engine 106 implements the CNN accelerator to process the CNN model and stores the result in the shared memory 116. At a fifth stage of operation 604, the vision logic 322 further processes the result of the CNN processing to generate a final output of the vision logic. Thereafter, at a sixth stage of operation 606, the vision logic 322 passes the final result to the context framework 324, which passes the result to the Java runtime environment 328 via the C-Java proxy 332. In this example, a seventh stage or operation 608 involves the context framework 324 also passing the final result of the vision logic 322 to the host interface 326 to notify an application processor for further processing.

Moving to FIG. 7, at an eighth stage of operation 702, the Java runtime environment 328 notifies a Java applet 330 of the results of the facial recognition procedure performed by the vision logic 322. At a ninth stage of operation 704, the Java applet 330 analyzes the results of the facial recognition analysis to, for example, confirm whether the recognized face corresponds to a user with particular preferences. If so, at a tenth stage of operation 706 the Java applet 330 calls a platform service 334 such as, for example, PWM to control some peripheral (e.g., blink an LED light).

Flowcharts representative of example hardware logic, machine readable instructions, hardware implemented state machines, and/or any combination thereof for implementing the context sensor hub 100 of FIGS. 1 and/or 3 is shown in FIGS. 8-15. The machine readable instructions may be an executable program or portion of an executable program for execution by a computer processor such as one or more of the processor cores of the example context sensor hub 100 of FIGS. 1 and/or 3. The program may be embodied in software stored on a non-transitory computer readable storage medium such as a CD-ROM, a floppy disk, a hard drive, a DVD, a Blu-ray disk, or a memory associated with the context sensor hub 100, but the entire program and/or parts thereof could alternatively be executed by a device other than the context sensor hub 100 and/or embodied in firmware or dedicated hardware. Further, although the example program is described with reference to the flowcharts illustrated in FIGS. 8-15, many other methods of implementing the example context sensor hub 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 8-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 8:
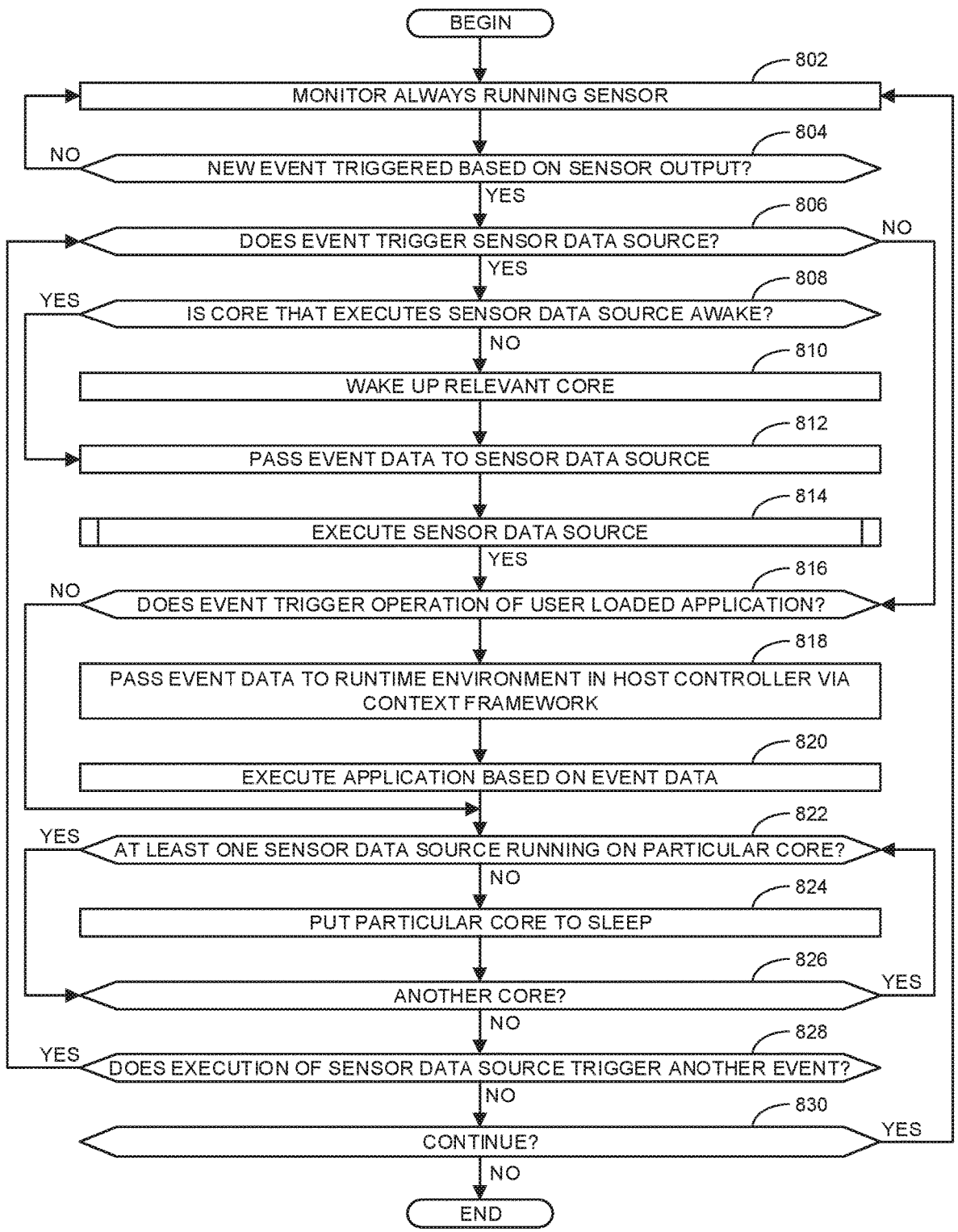
Figure 9:
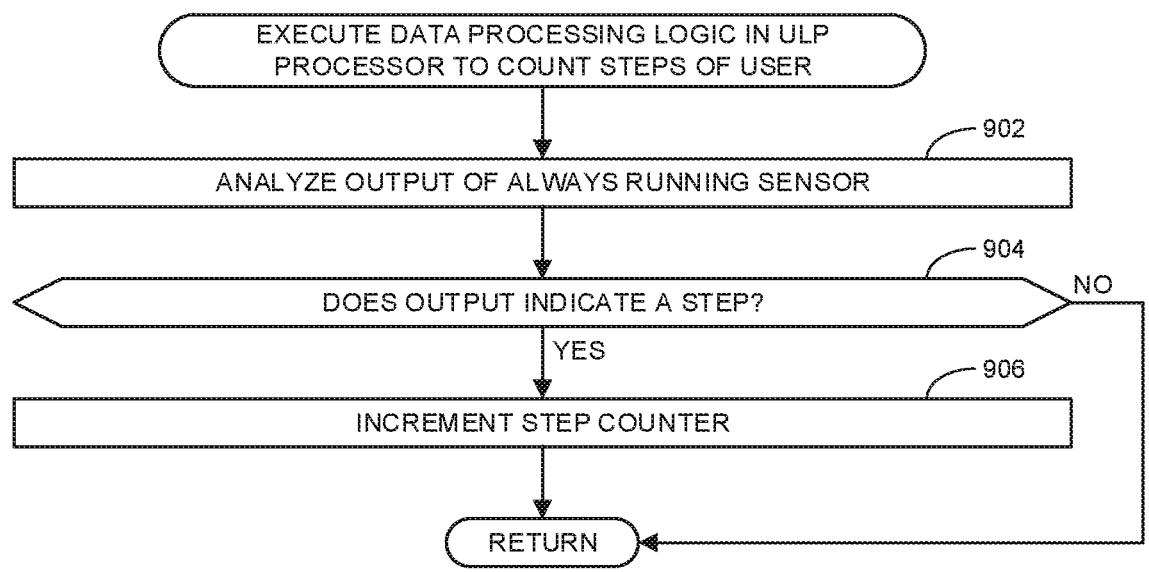

The program of FIG. 8 begins at block 802 where the example ULP processor core 110 monitors an always running sensor. At block 804, the example ULP processor core 110 determines whether a new event is triggered based on the sensor output. If not, control returns to block 802. If so, control advances to block 806, where the example ULP service framework 338 of the ULP processor core 110 determines whether the event triggers a sensor data source. In some examples, the ULP service framework 338 makes this determination by referencing a sensor tree (e.g., the sensor tree 400 of FIG. 4) to identify what clients (physical or virtual sensor data sources) are to receive data associated with the triggered event. As discussed above, sensor data sources include sensor hardware drivers (represented as physical sensors in the sensor tree 400 of FIG. 4) or data processing logic (represented as virtual sensors in the sensor tree 400 of FIG. 4). If the example ULP service framework 338 determines that the event triggers a sensor data source (block 806), control advances to block 808 where the example ULP processor core 110 determines whether the core that executes the sensor data source is awake. If not, at block 810, the example ULP processor core 110 wakes up the relevant core before control advances to block 812. If the relevant core is already awake, control advances directly to block 812 where the example ULP processor core passes event data to the sensor data source. In some examples, the event data is passed based on a call to the offload API proxy 310 to offload tasks for particular logic in the process of being executed. At block 814, the relevant core executes the sensor data source. That is, the relevant core implements the sensor hardware driver or the data processing logic corresponding to the triggered sensor data source. The particular core that implements block 814 and the associated procedures depends upon the particular sensor data source and its associated purpose. Example implementations of block 814 are provided below in connection with FIGS. 9-15. Thereafter, control advances to block 816. Returning to block 806, if the example ULP service framework 338 determines that the event does not trigger a sensor data source, control advances directly to block 816.

At block 816, the example ULP service framework 338 determines whether the event trigger operation of a user loaded application (e.g., a Java applet 330). If the example ULP service framework 338 determines that the event triggers operation of a user loaded application, control advances to block 818 where the ULP service framework 338 passes event data to a runtime environment (e.g., the Java runtime environment 328) in the host controller 102 via the context framework 324. At block 820, the host controller 102 execute the application based on the event data. Thereafter, control advances to block 822. If the example ULP service framework 338 determines that the event does not trigger operation of a user loaded application (block 816), control advances directly to block 822.

At block 822, the example context sensor hub 100 determines whether at least one sensor data source (e.g., a sensor hardware driver or data processing logic) is running on a particular core. In some examples, the framework associated with each core (e.g., the context framework 324 for the host controller 102, the ULP service framework 338 for the ULP processor core 110, or the offloading service framework for the corresponding offload engine 104, 106, 108) performs this determination for the sensor data sources executed by its corresponding core. If no sensor data sources for the particular core are running, control advances to block 824 where the corresponding framework (e.g., the context framework 324, the ULP service framework 338, or the offloading service framework 348) puts the particular core to sleep. Thereafter, control advances to block 826. If at least one sensor data source associated with the particular core is running, control advances directly to block 826. At block 826, the context sensor hub 100 determines whether there is another core. If so, control returns to block 822 to analyze the sensor data sources of the next core. As mentioned above, in some examples, each of the cores perform the determination at block 822 separately such that the process may not be looped as represented by block 826.

At block 828, the particular core that executed the sensor data source at block 814 determines whether the execution of the sensor data source triggers another event. If so, control returns to block 806 to repeat the process except that blocks 806-812, 816, and 818 are now performed by the particular core that executed the sensor data source triggered at block 806 in the previous iteration of the process. If it is determined that the output of the sensor data source does not trigger another event, control advances to block 830 where the context sensor hub 100 determines whether to continue. If so, control returns to block 802. Otherwise, the example process of FIG. 8 ends.

As mentioned above, FIGS. 9-15 provide example implementations of the block 814 associated with different sensor data sources executed by different cores. For example, FIG.

9 illustrates a process to execute data processing logic in the ULP processor core 110 to count steps of a user (i.e., to provide the functionality of a pedometer). The example process of FIG. 9 begins at block 902 where the ULP processor core 110 analyzes the output of the always running sensor based on the data processing logic. At block 904, the example ULP processor core 110 determines whether the output indicates a step. If so, control advances to block 906 where the example ULP processor core 110 increments a step counter. Thereafter, the example process of FIG. 9 ends and returns to complete the process of FIG. 8. If the output does not indicate a step, the example process of FIG. 9 ends without incrementing the counter and returns to complete the process of FIG. 8.

FIG. 10 illustrates data processing logic in the ULP processor core 110 to detect speech in audio (e.g., the raw speech recognition logic described in connection with FIG. 2). The example process of FIG. 10 begins at block 1002 where the ULP processor core 110 implements the raw speech recognition logic based on the speech detection model. At block 1004, the example ULP processor core 110 stores the result in the shared memory. Thereafter, the example process of FIG. 10 ends and returns to complete the process of FIG. 8.

FIG. 11 illustrates data processing logic in the audio offload engine 108 to detect speech in audio (e.g., the accurate speech recognition logic described in connection with FIG. 2). The example process of FIG. 11 begins at block 1102 where the example audio offload engine 108 activates the DNN hardware accelerator 134. At block 1104, the example audio offload engine 108 implements the raw speech recognition logic based on the speech detection model. At block 1106, the example audio offload engine 108 stores the result in the shared memory. Thereafter, the example process of FIG. 11 ends and returns to complete the process of FIG. 8.

Figure 12:
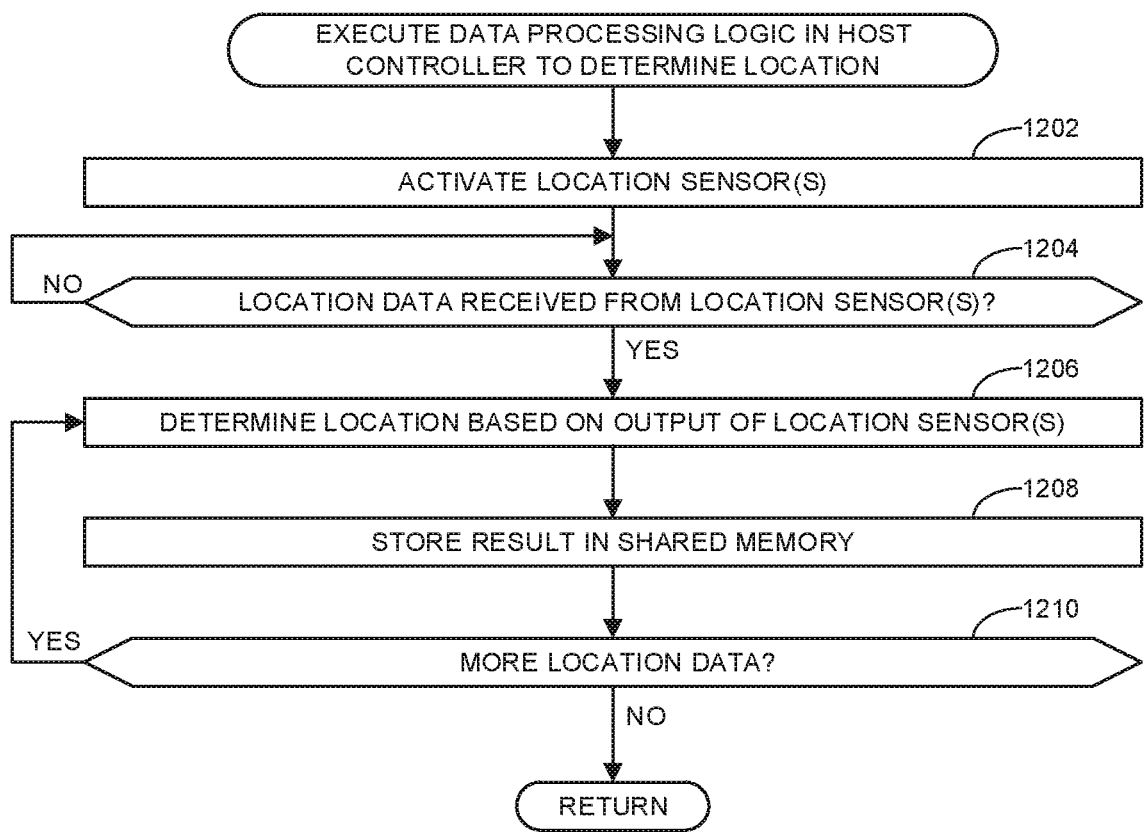

FIG. 12 illustrates data processing logic in the host controller 102 to determine a location. In some examples, this process is triggered based on output of logic executed on the ULP processor core 110 analyzing outputs from the always running motion sensors. The example process of FIG. 12 begins at block 1202 where the host controller 102 activates the location sensor(s) (e.g., by executing the associated driver in the host controller 102). At block 1204, the example host controller 102 determines whether location data has been received from the location sensor(s). If not, control stays at block 1204. If so, control advances to block 1206 where the example host controller 102 determines the location based on the location data from the location sensor(s). At block 1208, the example host controller 102 stores the result in the shared memory. At block 1210, the example host controller 102 determines whether there is more location data (e.g., indicative of the electronic device still moving). If so, control returns to block 1206. Otherwise, the example process of FIG. 12 ends and returns to complete the process of FIG. 8.

Figure 13:
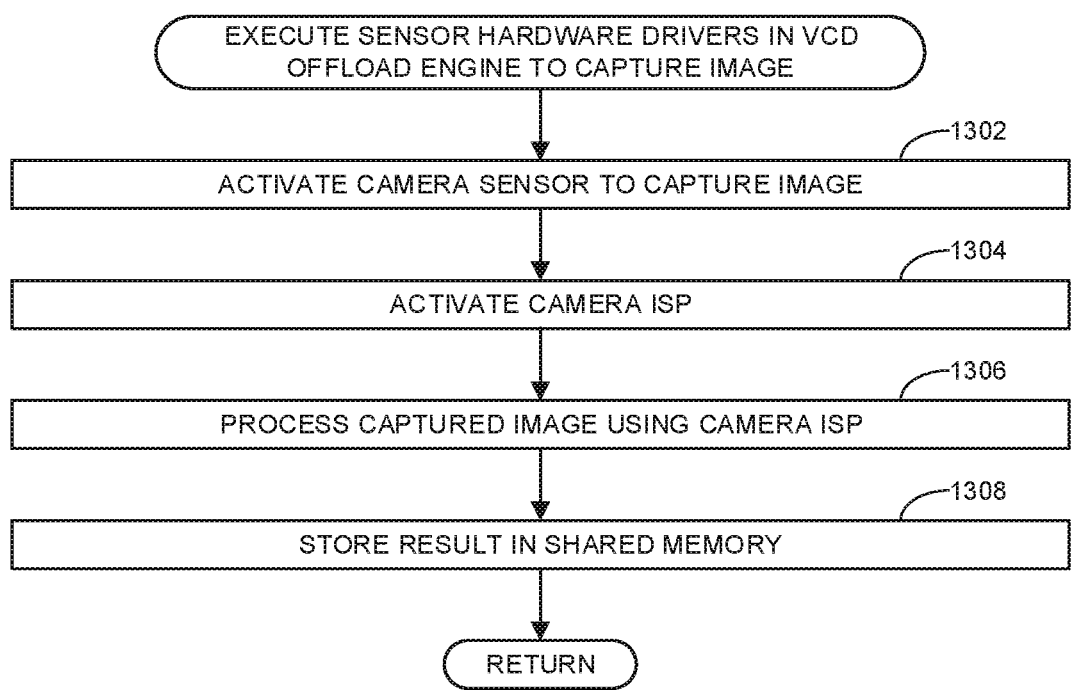

FIG. 13 illustrates sensor hardware drivers in the VCD offload engine 104 to capture an image. The example process of FIG. 13 begins at block 1302 where the VCD offload engine 104 activates the camera sensor to capture an image. At block 1304, the example VCD offload engine 104 activates the camera ISP. At block 1306, the example VCD offload engine 104 processes the captured image using the camera ISP. At block 1308, the example VCD offload engine 104 stores the result in the shared memory. Thereafter, the example process of FIG. 13 ends and returns to complete the process of FIG. 8.

Figure 14:
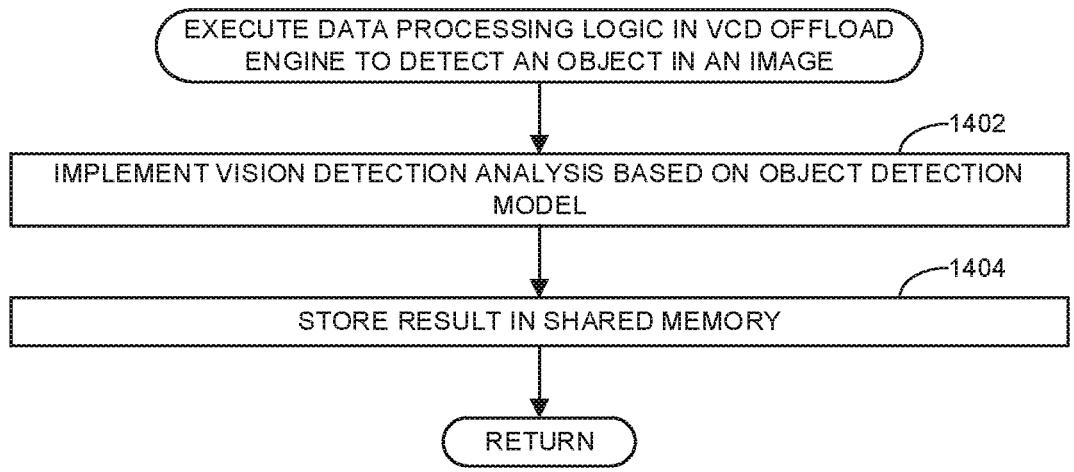

FIG. 14 illustrates data processing logic in the VCD offload engine 104 to detect an object in an image. The example process of FIG. 14 begins at block 1402 where the VCD offload engine 104 implements vision detection analysis based on the object detection model. At block 1404, the example VCD offload engine 104 stores the result in the shared memory. Thereafter, the example process of FIG. 14 ends and returns to complete the process of FIG. 8.

Figure 15:
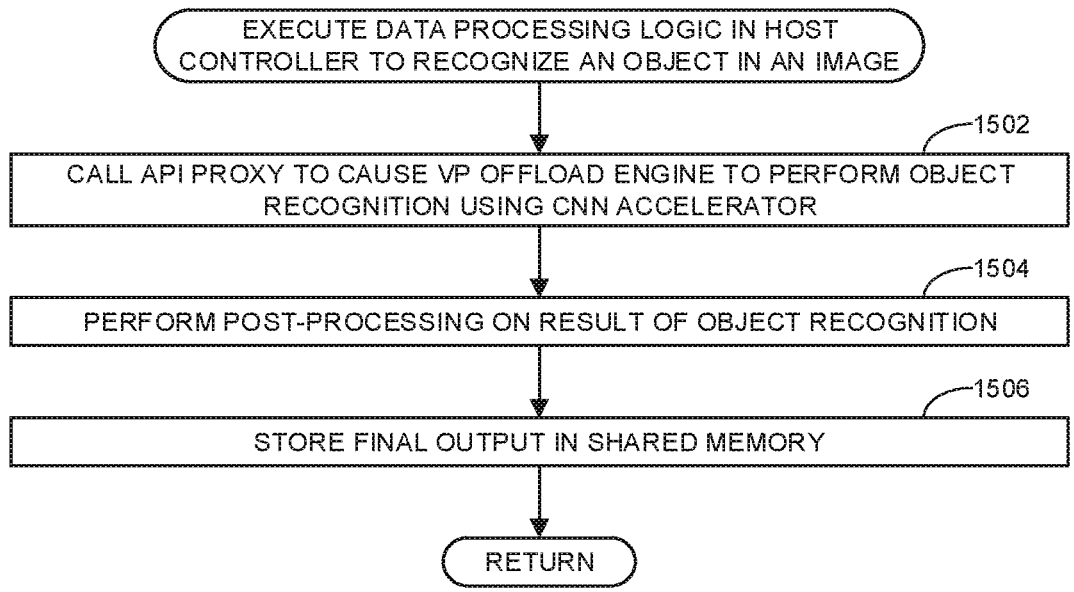

FIG. 15 illustrates data processing logic in the host controller 102 to recognize an object in an image. In some examples, the object may be a face. The example process of FIG. 15 begins at block 1502 where the example host controller 102 calls the API proxy 310 to cause the VP offload engine 106 to perform the object recognition using the CNN accelerator 130. At block 1504, the example host controller 102 performs post-processing on the result of the object recognition. At block 1506, the example host controller 102 stores the final output in the shared memory 116. Thereafter, the example process of FIG. 15 ends and returns to complete the process of FIG. 8.

From the foregoing, it will be appreciated that example methods, apparatus and articles of manufacture have been disclosed that enable the aggregation and processing of both basic sensor data and higher level context-based sensor data associated with, for example, location, vision, and/or audio analysis in a power efficient manner suitable for always-on applications. Implementing the relatively computationally intensive context-based processing in a power efficient manner is achieved by integrating multiple processor cores in a single system (e.g., a single chip) to enable particular cores to be activated and powered when needed to offload particular computational tasks and then put to sleep when not needed to save power. The management of functionalities distributed across multiple different processor cores is facilitated by implementing one core as a host that either contains the logic for the computations tasks or wrappers to access the logic executed in the other cores. Disclosed methods, apparatus and articles of manufacture are accordingly directed to one or more improvement(s) in the functioning of a computer.

Example 1 includes an apparatus comprising a first processor core to implement a host controller, and a second processor core to implement an offload engine, the host controller including first logic to process sensor data associated with an electronic device when the electronic device is in a low power mode, the host controller to offload a computational task associated with the sensor data to the offload engine, the offload engine including second logic to execute the computational task.

Example 2 includes the apparatus as defined in example 1, further including a third processor core, the third processor core to operate in a lower power domain than either the first or second processor cores, the third processor core to monitor a sensor associated with the electronic device when the first and second processor cores are asleep.

Example 3 includes the apparatus as defined in example 2, wherein the third processor core is to detect a trigger event based on sensor data output by the sensor and to wake up the host controller in response to the trigger event.

Example 4 includes the apparatus as defined in any one of examples 2 or 3, wherein the host controller includes a hardware driver for the sensor.

Example 5 includes the apparatus as defined in any one of examples 1-4, wherein the host controller includes a wrapper associated with the second logic.

Example 6 includes the apparatus as defined in any one of examples 1-5, wherein the offload engine is a first offload engine, the apparatus further including a third processor core to implement a second offload engine, the first offload engine to implement first sensor data analysis and the second offload engine to implement second sensor data analysis, the first sensor data analysis different than the second sensor data analysis.

Example 7 includes the apparatus as defined in example 6, wherein the first sensor data analysis corresponds to a vision detection analysis and the second sensor data analysis corresponds to a vision recognition analysis.

Example 8 includes the apparatus as defined in example 7, wherein the third processor core includes a convolution neural network accelerator.

Example 9 includes the apparatus as defined in example 8, wherein the host controller is to dynamically update a model to be analyzed with the convolution neural network accelerator.

Example 10 includes the apparatus as defined in any one of examples 6-9, wherein the first sensor data analysis corresponds to at least one of a vision detection analysis or a vision recognition analysis and the second sensor data analysis corresponds to at least one of a speech detection analysis or a voice recognition analysis.

Example 11 includes the apparatus as defined in example 10, wherein the second processor core includes a convolution neural network accelerator and the third processor core includes a deep neural network accelerator.

Example 12 includes the apparatus as defined in any one of examples 10 or 11, wherein the host controller is to include third logic to determine a location of the electronic device.

Example 13 includes the apparatus as defined in any one of examples 6-12, wherein the host controller is to maintain a data structure defining client-server relationships between different sensor data sources, the different sensor data sources corresponding to either a sensor hardware driver or sensor data processing logic, the data structure to identify which one of the first, second, or third processor core is to include respective ones of the sensor data sources.

Example 14 includes the apparatus as defined in example 13, wherein the host controller is to determine when none of the sensor data sources of the host controller are running, and to put the host controller to sleep based on the determination.

Example 15 includes the apparatus as defined in any one of examples 13 or 14, wherein the host controller is to share the data structure with the first and second offload engines, at least one of the host controller, the first offload engine, or the second offload engine is to determine whether to wake up a different one of the at least one of the host controller, the first offload engine, or the second offload engine based on the client-server relationships between different sensor data sources.

Example 16 includes the apparatus as defined in any one of examples 1-15, wherein the host controller and the offload engine are to communicate via interprocess communication.

Example 17 includes the apparatus as defined in example 16, wherein the host controller is to offload the computational task by calling an application programming interface (API) proxy associated with the interprocess communication.

Example 18 includes the apparatus as defined in any one of examples 1-17, wherein the host controller includes a runtime environment to execute a user loaded application when the electronic device is in the low power mode.

Example 19 includes the apparatus as defined in any one of examples 1-18, wherein at least one of the first processor core or the second processor core is to implement multi-threading.

Example 20 includes the apparatus as defined in any one of examples 1-20, further including memory shared by the first and second processor cores, the memory having a first memory size, the host controller to communicate with an application processor of the electronic device to load a block of data, the block of data associated with a second memory size larger than the first memory size.

Example 21 includes a non-transitory computer readable medium comprising instructions that, when executed, cause at least one system to at least process, with first logic of a first processor core, sensor data associated with an electronic device when the electronic device is in a sleep mode, offload a computational task associated with the sensor data to an offload engine implemented in a second processor core, and process, based on second logic of the second processor core, the sensor data to implement the computational task.

Example 22 includes the non-transitory computer readable medium as defined in example 21, wherein the instructions further cause the at least one system to monitor, based on third logic of a third processor core, a sensor associated with the electronic device when the first and second processor cores are asleep, the third processor core to operate in a lower power domain than either the first or second processor cores.

Example 23 includes the non-transitory computer readable medium as defined in example 22, wherein the instructions further cause the at least one system to detect, with the third processor core, a trigger event based on the sensor data output by the sensor, and in response to the trigger event, wake up the first processor core.

Example 24 includes the non-transitory computer readable medium as defined in any one of examples 22 or 23, wherein the instructions further cause the at least one system to implement a hardware driver for the sensor.

Example 25 includes the non-transitory computer readable medium as defined in any one of examples 21-24, wherein the instructions further cause the at least one system to implement a wrapper associated with the second logic.

Example 26 includes the non-transitory computer readable medium as defined in any one of examples 21-25, wherein the offload engine is a first offload engine, the instructions further causing the at least one system to perform, with the first offload engine, first sensor data analysis, and perform, with a second offload engine implemented by a third processor core, second sensor data analysis, the first sensor data analysis different than the second sensor data analysis.

Example 27 includes the non-transitory computer readable medium as defined in example 26, wherein the first sensor data analysis corresponds to a vision detection analysis and the second sensor data analysis corresponds to a vision recognition analysis.

Example 28 includes the non-transitory computer readable medium as defined in example 27, wherein the instructions further cause the at least one system to implement a convolution neural network accelerator.

Example 29 includes the non-transitory computer readable medium as defined in example 28, wherein the instructions further cause the at least one system to dynamically update, with the first processor core, a model to be analyzed with the convolution neural network accelerator.

Example 30 includes the non-transitory computer readable medium as defined in any one of examples 26-29, wherein the instructions further cause the at least one system to maintain, with the first processor core, a data structure defining client-server relationships between different sensor data sources, the different sensor data sources corresponding to either a sensor hardware driver or sensor data processing logic, the data structure to identify which one of the first, second, or third processor core includes respective ones of the sensor data sources.

Example 31 includes the non-transitory computer readable medium as defined in example 30, wherein the instructions further cause the at least one system to determine when none of the sensor data sources of the first processor core are running, and deactivate the first processor core based on the determination.

Example 32 includes the non-transitory computer readable medium as defined in any one of examples 30 or 31, wherein the instructions further cause the at least one system to share the data structure with the second and third processor cores, and determine, by at least one of the first, second, or third processor cores, whether to wake up a different one of the at least one of the first, second, or third processor cores based on the client-server relationships between different sensor data sources.

Example 33 includes the non-transitory computer readable medium as defined in any one of examples 21-32, wherein the instructions further cause the at least one system to implement communications between the first and second processor core using interprocess communication.

Example 34 includes the non-transitory computer readable medium as defined in example 33, wherein the instructions further cause the at least one system to offload the computational task by calling an application programming interface (API) proxy associated with the interprocess communication.

Example 35 includes the non-transitory computer readable medium as defined in any one of examples 21-34, wherein the instructions further cause the at least one system to implement, in the first processor core, a runtime environment to execute a user loaded application when the electronic device is in a sleep mode.

Example 36 includes the non-transitory computer readable medium as defined in any one of examples 21-35, wherein the instructions further cause the at least one system to communicate with an application processor of the electronic device to load a block of data, the block of data associated with a first memory size larger than a second memory size associated with a local memory shared by the first and second processor cores.

Example 37 includes a method comprising processing, based on first logic of a first processor core, sensor data associated with an electronic device when the electronic device is in an idle mode, offloading a computational task associated with the sensor data to an offload engine implemented in a second processor core, and processing, based on second logic of the second processor core, the sensor data to implement the computational task.

Example 38 includes the method as defined in example 37, further including monitoring, based on third logic of a third processor core, a sensor associated with the electronic device when the first and second processor cores are asleep, the third processor core to operate in a lower power domain than either the first or second processor cores.

Example 39 includes the method as defined in example 38, furthering including detecting, with the third processor core, a trigger event based on the sensor data output by the sensor, and in response to the trigger event, waking the first processor core.

Example 40 includes the method as defined in any one of examples 37-39, wherein the offload engine is a first offload engine, the method further including performing, with the first offload engine, first sensor data analysis, and performing, with a second offload engine implemented by a third processor core, second sensor data analysis, the first sensor data analysis different than the second sensor data analysis.

Example 41 includes the method as defined in example 40, wherein the third processing core includes a convolution neural network accelerator, the method further including dynamically updating, with the first processor core, a model to be analyzed with the convolution neural network accelerator.

Example 42 includes the method as defined in any one of examples 40 or 41, further including determining, with the first processor core, a location of the electronic device based on the sensor data.

Example 43 includes the method as defined in any one of examples 40-42, further including maintaining, with the first processor core, a data structure defining client-server relationships between different sensor data sources, the different sensor data sources corresponding to either a sensor hardware driver or sensor data processing logic, the data structure to identify which one of the first, second, or third processor core includes respective ones of the sensor data sources.

Example 44 includes the method as defined in example 43, further including determining when none of the sensor data sources of the first processor core are running, and deactivating the first processor core based on the determination.

Example 45 includes the method as defined in any one of examples 43 or 44, further including sharing the data structure with the second and third processor cores, and determining, by at least one of the first, second, or third processor cores, whether to wake up a different one of the at least one of the first, second, or third processor cores based on the client-server relationships between different sensor data sources.

Example 46 includes the method as defined in any one of examples 37-45, further including implementing communications between the first and second processor core using interprocess communication.

Example 47 includes the method as defined in example 46, wherein the offloading of the computational task includes calling an application programming interface (API) proxy associated with the interprocess communication.

Example 48 includes the method as defined in any one of examples 37-47, further including implementing, in the first processor core, a runtime environment to execute a user loaded application when the electronic device is in the idle mode.

Example 49 includes the method as defined in any one of examples 37-48, wherein at least one of the first processor core or the second processor core is to implement multi-threading.

Example 50 includes the method as defined in any one of examples 37-49, further including communicating with an application processor of the electronic device to load a block of data, the block of data associated with a first memory size larger than a second memory size associated with a local memory shared by the first and second processor cores.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a first processor core to implement a host controller, the first processor core to consume a first amount of power within a first power range associated with a first power domain;
    a second processor core to implement an offload engine, the second processor core to consume a second amount of power within the first power range associated with the first power domain, the host controller including first logic to process sensor data associated with an electronic device, the first and second processor cores to operate in the first power domain, the first power domain to enable the electronic device to be in a low power mode while at least one of the first processor core or the second processor core is in operation, the host controller to offload a computational task associated with the sensor data to the offload engine, the offload engine including second logic to execute the computational task; and
    a third processor core to operate in a second power domain and to consume a third amount of power within a second power range associated with the second power domain, the second power range lower than the first power range, the second power domain associated with more power than an off state, the third amount of power less than the first amount of power and less than the second amount of power.

2. The apparatus as defined in claim 1, wherein the third processor core is to monitor a sensor associated with the electronic device when the first and second processor cores are asleep.

3. The apparatus as defined in claim 2, wherein the third processor core is to detect a trigger event based on sensor data output by the sensor and to wake up the host controller in response to the trigger event.

4. The apparatus as defined in claim 2, wherein the host controller includes a hardware driver for the sensor.

5. The apparatus as defined in claim 1, wherein the host controller includes a wrapper associated with the second logic.

6. The apparatus as defined in claim 1, wherein the offload engine is a first offload engine, the apparatus further including a fourth processor core to implement a second offload engine, the first offload engine to implement first sensor data analysis and the second offload engine to implement second sensor data analysis, the first sensor data analysis different than the second sensor data analysis.

7. The apparatus as defined in claim 6, wherein the first sensor data analysis corresponds to a vision detection analysis and the second sensor data analysis corresponds to a vision recognition analysis.

8. The apparatus as defined in claim 6, wherein the first sensor data analysis corresponds to at least one of a vision detection analysis or a vision recognition analysis and the second sensor data analysis corresponds to at least one of a speech detection analysis or a voice recognition analysis.

9. The apparatus as defined in claim 8, wherein the second processor core includes a convolution neural network accelerator and the third processor core includes a deep neural network accelerator.

10. The apparatus as defined in claim 8, wherein the host controller is to include third logic to determine a location of the electronic device.

11. The apparatus as defined in claim 1, wherein the host controller and the offload engine are to communicate via interprocess communication.

12. The apparatus as defined in claim 11, wherein the host controller is to offload the computational task by calling an application programming interface (API) proxy associated with the interprocess communication.

13. The apparatus as defined in claim 1, wherein the host controller includes a runtime environment to execute a user loaded application when the electronic device is in the low power mode.

14. The apparatus as defined in claim 1, further including memory shared by the first and second processor cores, the memory having a first memory size, the host controller to communicate with an application processor of the electronic device to load a block of data, the block of data associated with a second memory size larger than the first memory size.

15. An apparatus comprising:
    a first processor core to implement a host controller; and
    a second processor core to implement an offload engine, the host controller including first logic to process sensor data associated with an electronic device when the electronic device is in a low power mode, the host controller to offload a computational task associated with the sensor data to the offload engine, the offload engine including second logic to execute the computational task, the host controller to maintain a data structure defining client-server relationships between different sensor data sources, the different sensor data sources corresponding to either a sensor hardware driver or sensor data processing logic, the data structure to identify which one of the first processor core or the second processor core is to include respective ones of the sensor data sources, the first processor core and the second processor core to operate in a first power domain, the first power domain associated with an operating power between 1 mW and 20 mW.

16. The apparatus as defined in claim 15, wherein the host controller is to determine when none of the sensor data sources of the host controller are running, and to put the host controller to sleep based on the determination.

17. An apparatus comprising:
    a first processor core to implement a host controller;
    a second processor core to implement a first offload engine, the host controller including first logic to process sensor data associated with an electronic device when the electronic device is in a low power mode, the host controller to offload a computational task associated with the sensor data to the first offload engine, the first offload engine including second logic to execute the computational task, the host controller to maintain a data structure defining client-server relationships between different sensor data sources, the different sensor data sources corresponding to either a sensor hardware driver or sensor data processing logic, the data structure to identify which one of the first processor core or the second processor core is to include respective ones of the sensor data sources; and
    a third processor core to implement a second offload engine, the host controller to share the data structure with the first and second offload engines, at least one of the host controller, the first offload engine, or the second offload engine to determine whether to wake up a different one of the at least one of the host controller, the first offload engine, or the second offload engine based on the client-server relationships between the different sensor data sources.

18. A non-transitory computer readable medium comprising instructions that, when executed, cause at least one system to at least:
  process, with first logic of a first processor core that consumes a first amount of power when in operation, sensor data associated with an electronic device while the electronic device is in a sleep mode, the sensor data generated while the electronic device is in the sleep mode, the first amount of power within a first power range associated with a first power domain;
  offload a computational task associated with the sensor data to an offload engine implemented in a second processor core that consumes a second amount of power when in operation, the second amount of power within the first power range associated with the first power domain;
  process, based on second logic of the second processor core, the sensor data to implement the computational task; and
  monitor, based on third logic of a third processor core that consumes a third amount of power when in operation, the third amount of power within a second power range associated with a second power domain, the second power range lower than the first power range, a sensor associated with the electronic device while the first and second processor cores are asleep, the second power domain associated with more power than an unpowered state.

19. The non-transitory computer readable medium as defined in claim 18, wherein the offload engine is a first offload engine, the instructions further causing the at least one system to:
  perform, with the first offload engine, first sensor data analysis; and
  perform, with a second offload engine implemented by a fourth processor core, second sensor data analysis, the first sensor data analysis different than the second sensor data analysis.

20. A non-transitory computer readable medium comprising instructions that, when executed, cause at least one system to at least:
  process, with first logic of a first processor core, sensor data associated with an electronic device when the electronic device is in a sleep mode;
  offload a computational task associated with the sensor data to an offload engine implemented in a second processor core;
  process, based on second logic of the second processor core, the sensor data to implement the computational task;
  maintain, with the first processor core, a data structure defining client-server relationships between different sensor data sources, the different sensor data sources corresponding to either a sensor hardware driver or sensor data processing logic, the data structure to identify which one of the first processor core or the second processor core includes respective ones of the sensor data sources;
  determine, based on the data structure, when none of the sensor data sources of the first processor core are running; and
  deactivate the first processor core to enter a sleep mode based on the determination.

21. A non-transitory computer readable medium comprising instructions that, when executed, cause at least one system to at least:
  process, with first logic of a first processor core, sensor data associated with an electronic device when the electronic device is in a sleep mode;
  offload a computational task associated with the sensor data to an offload engine implemented in a second processor core;
  process, based on second logic of the second processor core, the sensor data to implement the computational task;
  maintain, with the first processor core, a data structure defining client-server relationships between different sensor data sources, the different sensor data sources corresponding to either a sensor hardware driver or sensor data processing logic, the data structure to identify which one of the first processor core or the second processor core includes respective ones of the sensor data sources;
  share the data structure with the second processor core; and
  determine, by at least one of the first or second processor cores, whether to wake up a different one of the at least one of the first or second processor cores based on the client-server relationships between the different sensor data sources.

22. A method comprising:
  processing, based on first logic of a first processor core that consumes a first amount of power within a first power range associated with a first power domain, sensor data associated with an electronic device, the first processor core to operate in the first power domain, the first power range associated with the first power domain between approximately 1 mW and approximately 20 mW;
  offloading a computational task associated with the sensor data to an offload engine implemented in a second processor core that consumes a second amount of power within the first power range associated with the first power domain, the second processor core to operate in the first power domain;
  processing, based on second logic of the second processor core, the sensor data to implement the computational task; and
  monitoring, based on third logic of a third processor core that consumes a third amount of power within a second power range associated with a second power domain, a sensor associated with the electronic device, the third processor core to operate in the second power domain, an upper limit of the second power range being less than or equal to approximately 1 mW, a lower limit of the second power range being more than no power, the third amount of power less than the first amount of power and less than the second amount of power.

23. The method as defined in claim 22, wherein the monitoring of the sensor occurs when the first and second processor cores are asleep.

24. The method as defined in claim 23, wherein the offload engine is a first offload engine, the method further including:
  performing, with the first offload engine, first sensor data analysis; and
  performing, with a second offload engine implemented by a fourth processor core, second sensor data analysis, the first sensor data analysis different than the second sensor data analysis.

* * * * *